United States Patent
Al-Qutub et al.

(10) Patent No.: US 9,745,208 B2
(45) Date of Patent: Aug. 29, 2017

(54) MULTI-STAGE BUBBLE COLUMN HUMIDIFIER APPARATUS

(71) Applicant: King Fahd University of Petroleum and Minerals, Dhahran (SA)

(72) Inventors: Amro Mohammad Al-Qutub, Dhahran (SA); Obaidallah Mohammad Munteshari, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 408 days.

(21) Appl. No.: 14/679,706

(22) Filed: Apr. 6, 2015

(65) Prior Publication Data

US 2016/0288013 A1    Oct. 6, 2016

(51) Int. Cl.
| | |
|---|---|
| *B01D 3/18* | (2006.01) |
| *B01F 3/04* | (2006.01) |
| *C02F 1/04* | (2006.01) |
| *B01D 1/14* | (2006.01) |
| *B01D 3/20* | (2006.01) |

(Continued)

(52) U.S. Cl.
CPC .............. *C02F 1/048* (2013.01); *B01D 1/14* (2013.01); *B01D 3/20* (2013.01); *B01D 3/346* (2013.01); *B01D 5/006* (2013.01); *C02F 2103/08* (2013.01); *C02F 2103/10* (2013.01); *Y02W 10/37* (2015.05)

(58) Field of Classification Search
CPC ... B01D 3/18; B01D 3/20; B01D 3/22; B01D 3/26; B01D 21/0036; B01D 21/0045; B01D 3/346; B01D 5/006; B01D 1/14; C02F 2103/08
See application file for complete search history.

(56) References Cited

U.S. PATENT DOCUMENTS

| | | | |
|---|---|---|---|
| 2,105,501 A | | 1/1938 | Parsons |
| 2,237,271 A | * | 4/1941 | Dunham ................ B01D 3/14 |
| | | | 196/140 |

(Continued)

*Primary Examiner* — Brian R Gordon
(74) *Attorney, Agent, or Firm* — Oblon, McClelland, Maier & Neustadt, L.L.P.

(57) ABSTRACT

A downcomer apparatus for use in a multi-stage bubble column humidifier. The humidifier comprises at least a first, second and third stage, wherein each of said stages includes an inlet, an outlet and a chamber defined by said stage, in fluid communication with the inlet and the outlet. In the humidifier, a heated liquid fluid stream flowing downwardly exchanges mass and heat with a cooler carrier gas stream flowing upwardly through the bubble column. A bubble generator comprising a perforated plate, or sparger, passes the carrier gas, such as air, from a lower chamber to form bubbles in a fluid, such as water, forming a bath on an upper chamber. An off-set arrangement of downcomer apparatuses, wherein said apparatus comprises a funnel, a watergate, and a downcomer, is used to prevent a recirculation of humid bubbles from the upper chamber to the lower chamber, thus preventing the air stream from circumventing the bubble generator in the form of the humid bubbles. This arrangement assures the maximum possible performance of the humidifier, as the entire air stream is forced to move through the bubble column, thus maximizing the air-water surface interface for an efficient mass and heat exchange.

19 Claims, 9 Drawing Sheets

(51) Int. Cl.
  *B01D 3/34* (2006.01)
  *B01D 5/00* (2006.01)
  *C02F 103/08* (2006.01)
  *C02F 103/10* (2006.01)

(56) References Cited

U.S. PATENT DOCUMENTS

| | | | | |
|---|---|---|---|---|
| 2,290,065 A * | 7/1942 | Natho | ............... | B01D 3/18 137/427 |
| 2,338,010 A * | 12/1943 | Ridgway | ............... | B01D 3/18 196/139 |
| 2,495,512 A * | 1/1950 | Dorfan | ............... | B01D 3/18 261/114.2 |
| 2,658,737 A | 11/1953 | Nutter | | |
| 2,682,395 A | 6/1954 | Claridge et al. | | |
| 2,737,377 A * | 3/1956 | Huggins | ............... | B01D 3/18 202/158 |
| 2,767,966 A * | 10/1956 | Chave | ............... | B01D 3/18 202/158 |
| 2,804,292 A * | 8/1957 | Schilling | ............... | B01D 3/18 165/142 |
| 3,364,988 A * | 1/1968 | Hartmann | ............... | B01D 3/20 165/85 |
| 3,501,400 A * | 3/1970 | Brody | ............... | B01D 3/06 159/31 |
| 3,687,425 A | 8/1972 | Katz | | |
| 4,045,190 A | 8/1977 | Judat et al. | | |
| 4,207,174 A | 6/1980 | Christman | | |
| 4,297,483 A * | 10/1981 | Mejdell | ............... | B01D 3/22 422/243 |
| 4,310,475 A * | 1/1982 | Leva | ............... | B01D 3/18 202/158 |
| 4,341,640 A * | 7/1982 | Landis | ............... | B01D 3/22 210/752 |
| 4,528,068 A | 7/1985 | Fiocco et al. | | |
| 4,597,947 A * | 7/1986 | Almaula | ............... | B01D 3/22 202/158 |
| 4,620,952 A * | 11/1986 | Hsieh | ............... | B01D 3/20 261/114.4 |
| 4,732,582 A * | 3/1988 | Mojonnier | ............... | B01D 3/18 96/158 |
| 5,102,583 A * | 4/1992 | Bannon | ............... | B01D 3/18 261/114.1 |
| 5,213,719 A * | 5/1993 | Chuang | ............... | B01D 3/20 261/114.1 |
| 5,378,267 A * | 1/1995 | Bros | ............... | B01D 3/22 96/168 |
| 5,641,436 A | 6/1997 | Potthoff et al. | | |
| 6,250,611 B1 | 6/2001 | Pilling et al. | | |
| 6,436,245 B1 * | 8/2002 | Nishimura | ............... | B01D 3/22 202/158 |
| 6,568,663 B1 * | 5/2003 | Xu | ............... | B01D 3/20 261/114.1 |
| 6,575,438 B2 | 6/2003 | Nutter et al. | | |
| 6,919,000 B2 | 7/2005 | Klausner et al. | | |
| 8,465,006 B2 | 6/2013 | Elsharqawy et al. | | |
| 8,517,352 B1 * | 8/2013 | Buttridge | ............... | B01D 3/008 261/110 |
| 8,523,985 B2 | 9/2013 | Govindan et al. | | |
| 8,778,065 B2 | 7/2014 | Govindan et al. | | |
| 2008/0264489 A1 * | 10/2008 | Naustdal | ............... | B01D 3/18 137/7 |
| 2013/0074694 A1 | 3/2013 | Govindan et al. | | |
| 2013/0269534 A1 | 10/2013 | Cash et al. | | |
| 2013/0341810 A1 | 12/2013 | Govindan et al. | | |
| 2014/0367871 A1 | 12/2014 | Govindan et al. | | |
| 2015/0217208 A1 * | 8/2015 | Overmyer | ............... | B01D 3/324 261/114.2 |

\* cited by examiner

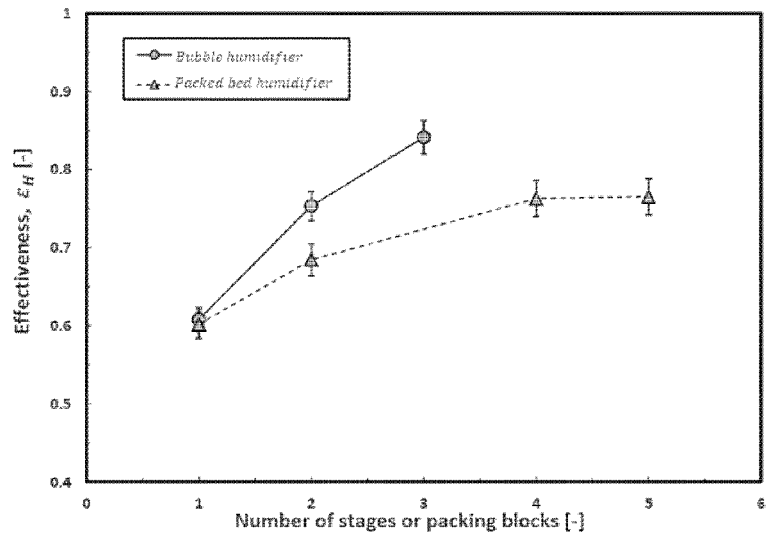
FIGURE 5
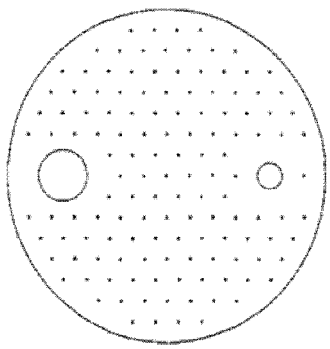   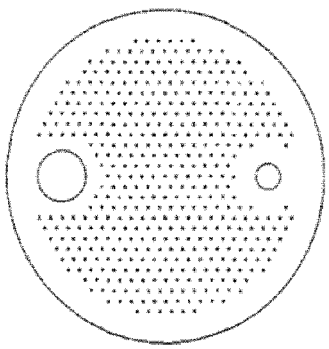   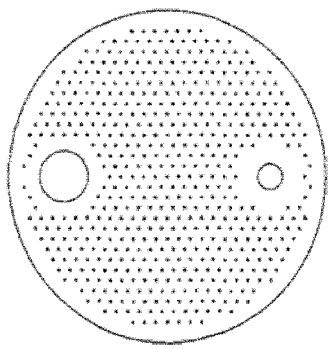
FIGURE 6a                FIGURE 6b                FIGURE 6c FIGURE 11
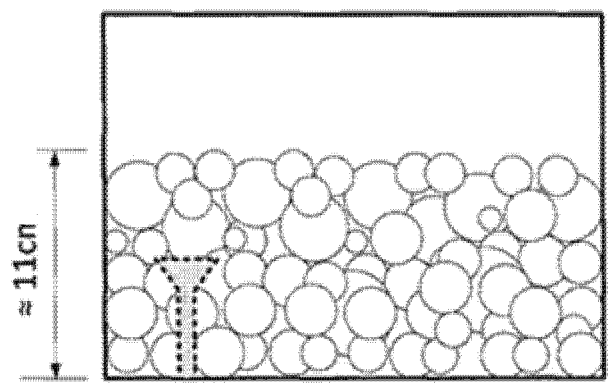
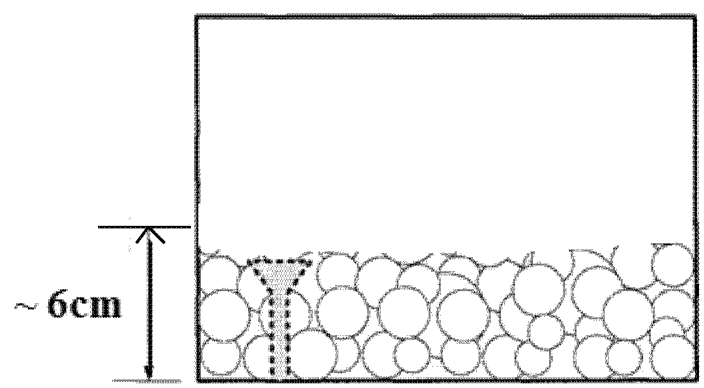
FIGURE 12

FIGURE 13a
FIGURE 13b
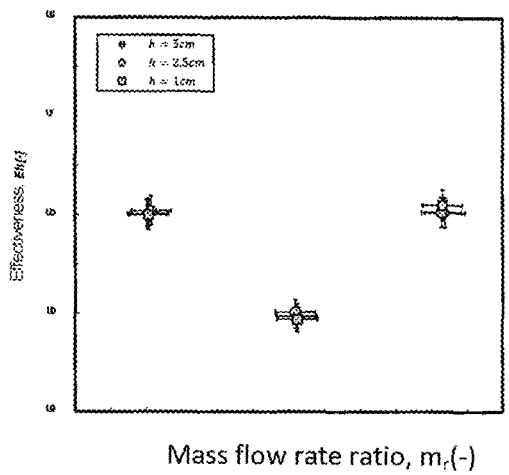
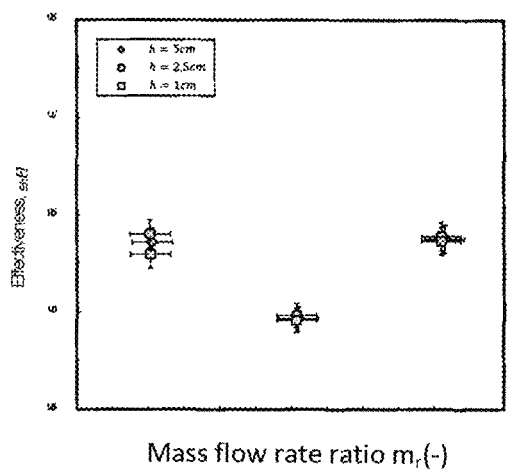
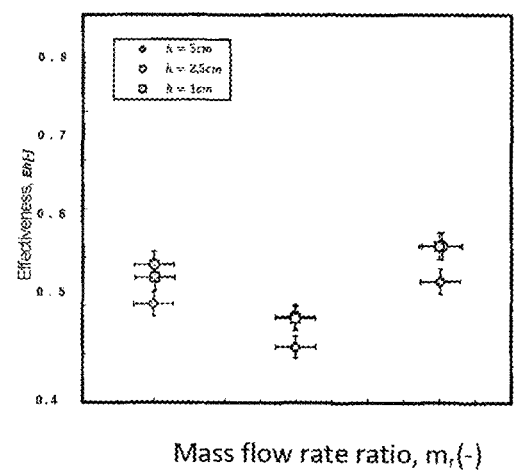
FIGURE 13c

MULTI-STAGE BUBBLE COLUMN HUMIDIFIER APPARATUS

FIELD OF THE INVENTION

A multi-stage bubble column humidifier apparatus comprising a downcomer unit. A multi-stage bubble column humidifier apparatus comprising a downcomer unit for use in a humidification-dehumidification system for purifying a liquid, such as water.

BACKGROUND OF THE INVENTION

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As explained in the "Special Report on Water" in the 20 May 2010 issue of *The Economist*, in this century, a shortage of fresh water may surpass a shortage of energy; and these two challenges are inexorably linked. Despite an increased focus on this issue, many subsequent reports, including the World Health Organization's "2014 Update on the Progress of Drinking Water and Sanitation", describe the uneven and unequal progress being made towards achieving fresh water supply goals.

Current estimates indicate that approximately 748 million people still lack access to an improved drinking water source. Of these, almost a quarter (173 million) rely on untreated surface water. Markedly, the discrepencies in accessing improved sources of drinking water correspond directly with geographic, sociocultural and economic inequalities.

The hazards posed by an insufficiency and/or incontinuity in the supply of clean water are particularly acute. Continuity of a water supply is taken for granted in most industrialized countries, but is of great concern in many developing countries. Recent estimates indicate that approximately half of the population of developing countries receive water on an intermittent basis, such as water being provided for a few hours per day, or a few days per week. Further still, the supply of fresh water is often seasonally inconsistent. Global warming, and any climate changes brought about, may further threaten these regions.

Understandably, an insufficient and/or intermittent supply of fresh water may lead to a variety of crises, including famine, disease, death, forced mass migration, cross-region conflict/war, and collapsed ecosystems. Despite the crucial need for fresh water, supplies of this liquid are nonetheless constrained.

Although nearly 70% of the Earth's surface is covered by water, 97.5% is saline and ocean-based. Of the remaining 2.5% (fresh) water, only 1% is easily accessible, i.e. found in underground aquifers. Adding to global shortages of fresh water is the fact that the distribution of freshwater that is easily available is vastly unequal. According to the World Business Council for Sustainable Development, more than half of the naturally-occurring fresh water supply is contained in regional drainage basins located in just nine countries (United States of America, Canada, Colombia, Brazil, Democratic Republic of Congo, Russia, India, China and Indonesia).

As the world's population escalates, a consequental shift in farming and industrialization occurs in order to support this growing number of people. These shifts further intensify the demands for clean, fresh water. Urban areas have a greater need for water beyond the basics for drinking and sanitation. As naturally occurring fresh water is typically confined to regional drainage basins, transport of fresh water to urban localities must be undertaken with ever-increasing costs.

Summarily, these increases in urbanization and population, as well as global warming, all have an impact on the environment, and contribute to the ecological consequences of drying reservoirs and falling aquifers. The resultant fresh water shortages necessitate methods of obtaining fresh water from non-fresh water sources such as, but not limited to, seawater, brackish water and/or even waste water.

In light of this issue, a number of apparatus have been developed to overcome fresh water shortages. These devices operate by separating pure water from a feed liquid selected from the group consisting of, but not limited to, seawater, brackish water and/or waste water. The term waste water includes flowback water and water produced during an oil or gas extraction/production process.

Flowback water or "backflow" water is further defined as a fracturing fluid mixture obtained after an extraction process (recovered fracturing fluid and produced water). It is also known as the recovered water and fracturing fluid which flows back from an oil or gas well drilling fracturing process. Both the fracturing chemicals and fresh water that is injected into the well during the fracturing process tend to dissolve salts in the rock formation, thus increasing the salinity of the flowback water. As such, flowback waters are typically high in salinity and total dissolved solids (TDS), and comprise from about 10-60% percent of the volume of fluid that was initially injected into the well. Flowback waters can also contain contaminants that are present in a rock formation undergoing a fracturing process.

Although there are many existing processes for producing fresh water from seawater brackish water, and/or waste water, the majority of them require massive amounts of energy. For example, despite being the current leading desalination technology, reverse osmosis (RO) is energy intensive and still relatively inefficient due to the high pressure required to drive water through membranes and their tendency to foul. In large-scale plants, the specific electricity required can be as low as 4 kWh/m$^3$ at 30% recovery, as compared to the theoretical minimum of around 1 kWh/m$^3$; while smaller-scale RO systems (e.g., aboard ships) are even less efficient.

Other existing seawater desalination systems include a thermal-energy-based multi-stage flash (MSF) distillation process, and a multi-effect distillation (MED) process; both of which are energy- and capital-intensive. Furthermore, in the MSF and MED systems, the maximum brine temperature and the maximum temperature of the heat input are limited so as to avoid calcium sulphate precipitation, which leads to a formation of a hard scale on the heat transfer equipment. As such, when these technologies are employed, they are usually done on a large scale and are mainly suitable for those economically advanced and resource-rich regions of the world, as many developing countries lack sufficient energy resources to carry out these methods.

One solution is to develop small-scale desalination technologies which can utilize solar energy. Humidification-dehumidification (HDH) desalination systems, are considered advantageous alternatives in providing low to medium scale water production for remote and off-grid areas, and thus provide a promising technology to resolve the issue of fresh water scarcity.

Key components of the HDH desalination systems include a humidifier, a dehumidifier, a compressor and an expander. They are also considered to be the same key components in a basic varied-pressure HDH desalination cycle; one of the many configurations of HDH desalination cycles. Of these components, the heat and mass transfer devices (humidifier and dehumidifier) play a major role in the HDH systems, and use a carrier gas, such as air, to communicate energy between a gas and a liquid, such as a seawater brine. In the humidifier, hot seawater comes into direct contact with dry air, and this air becomes heated and humidified. In the dehumidifier, the heated and humidified air is brought into (indirect) contact with cold seawater and gets dehumidified, producing pure water and dehumidified air.

In light of fresh water demands, efficient, high-performance humidification dehumidification desalination (HDH) systems are necessitated. Those systems comprising a low-cost humidifier possessing an efficiency rating of 85±5% are greatly preferred, as the overall efficiency of the HDH system will also be directly increased.

There are several devices that could be used as a humidifier for the HDH systems. These devices include, but are not limited to, packed bed towers, spray towers, wetted-wall towers, and bubble columns. [R. E. Treybal *Mass transfer operations*. $3^{rd}$ edition New York: McGraw-Hill 1980 Incorporated herein by reference in its entirety.]

In a spray tower, water is sprayed at the top of a cylindrical column and falls in the form of droplets—due to gravity—while a running air stream flows upward, so as to be in direct contact with the water droplets. Mist eliminators are essential in this situation, so as to avoid water entrainment in the air leaving the column. These types of humidification devices have a low effectiveness due to their low water hold up. Moreover, the pressure drop in the water stream is high due to the losses in the spray nozzles. [F. Kreith and R. F. Bohem; *Direct-contact heat transfer*. Washington: Hemisphere Pub. Corp., 1988 Incorporated herein by reference in its entirety.]

As for wetted-wall towers, these devices suffer from a low water flow rate capacity since the water only flows on the inner surface of the tower, and they are not preferred. Conversely, the packed bed tower is widely used as a humidifier in HDH systems [Said Al-Hallaj, Mohammed Mehdi Farid, and Abdul Rahman Tamimi. "Solar desalination with a humidification-dehumidification cycle: performance of the unit". Desalination 120.3 (1998), pp. 273-280. Y. J. Dai, R. Z. Wang, and H. F. Zhang. "Parametric analysis to improve the performance of a solar desalination unit with humidification and dehumidification". Desalination 142.2 (2002), pp. 107-118.93. A. S. Nafey, H. E. S. Fath, S. O. El-Helaby, and A. Soliman. "Solar desalination using humidification-dehumidification processes. Part II. An experimental investigation". Energy Conversion and Management 45.78 (2004), pp. 1263-1277. Ghazi Al-Enezi, Hisham Ettouney, and Nagla Fawzy. "Low temperature humidification dehumidification desalination process". Energy Conversion and Management 47.4 (2006), pp. 470-484. G. Prakash Narayan, Maximus G. St. John, Syed M. Zubair, and John H. Lienhard V: "Thermal design of the humidification dehumidification desalination system: An experimental investigation". International Journal of Heat and Mass Transfer 58.12 (2013), pp. 740-748.11-15. Incorporated herein by reference in their entirety.] However, in some operations, the fluid passing through the packed bed may contain suspended solid particles that can accumulate on the packing material and cause a reduction in the gas-liquid volumetric flow rates and, in extreme cases, a plugging of the tower. Therefore, alternative methods to using a packed bed tower are desired.

Recently, bubble columns have received much consideration as such an alternative to packed bed towers [(G. P. Narayan, M. H. Sharqawy, S. Lam, J. H. Lienhard V, and M. St. John. "Multistage bubble column humidifier". Pat. Application Publication No. US 2014/0367871. Incorporated herein by reference in its entirety.] In a simplistic bubble column humidifier, hot water enters into the bubble column and accumulates until it reaches a certain level while air is concurrently injected into the column through a perforated plate or perforated pipe (sparger) located at the bottom of the column. This results in the formation of bubbles in the pool, or bath of accumulated hot water. In an alternative embodiment, bubble columns comprise upright columns provided with a multiplicity of spaced-apart stages each provided with a porous structure, sometimes referred to in the art as a bubble generator or bubble distributor.

Porous structures commonly used in these apparatus include those such as sieve plates and/or spargers comprising openings that can be described as pores, holes, or perforations. It is through these openings that a flowing stream of gas is passed so as to contact with a liquid stream being generally conveyed downwardly, and in cross-current flow, from stage to stage so as to maintain a substantially continuous phase. Such apparatus are commonly used to treat waste water or sea water in order to obtain pure or fresh water.

During a vapor-liquid contact process, such as a humidification process, if a pressurized gas is forced into a liquid through a fine network of openings in a porous structure, small diameter bubbles of the gas are formed in the liquid, resulting in a foam, or froth. This froth aids in the transfer of heat from the water to the gas. The smaller the bubbles, the higher the ratio of the carrier gas to the feed liquid so as to permit a greater efficiency in the mass and temperature transfer between a carrier gas and a feed liquid.

Previously, drilled porous plates, or spargers, possess openings that produce larger bubbles. As these bubbles do not as readily absorb a liquid component in vapor form, it is necessary to find those porous structures that can generate finer bubbles. Smaller bubbles increase the surface area to volume ratio and, therefore, speed up the mass and heat transfer reaction rates to save valuable processing time. Some porous structures have a 'nozzle-like' design, wherein the openings on the lower, or gas entrance side, are greater in diameter when compared to their respective openings on the upper, or gas exit side. This design provides a pressure advantage, and, if a lower internal pressure occurs, the finer pore openings (smaller diameter) are also used to prevent any liquid from penetrating back into the pores.

Although the finer pore size may favor the exchange of mass and heat between the cross flow streams, other factors including, but not limited to, the integrity of the porous structure and the amount of solids found in the liquid stream, should be considered when choosing a porous structure for a humidifier apparatus. It is noted that the smaller the porous openings, the greater risk of fouling of the openings by sediments, salts and other contaminants found in a feed liquid. Porous structures having too great of a total porous surface area often suffer from cracking, or breaking, with increased gas pressure stresses.

Further to mass and temperature transfer, this interchange by direct contact between a liquid, such as water, and a gas, such as air, is effected by causing the gas to bubble through a thermal layer, or layers of the liquid. The air bubbles, as they enter from a lower vantage point and pass through the water bath on each stage, provide for a larger surface area of contact between the gas and the heated liquid (to be cooled). The effect of such an arrangement is that the air streams or bubbles that form are continuously distorted and become subject to turbulence which is created as they pass through the much denser thermal layer or layers of the liquid bath. The result of this turbulence is that the interior of the air bubbles and air streams are brought to the interface of a cooler gas and a warmer liquid, and thereby heat transfer is promoted (achieved). Mass exchange occurs when the gas, now humidified, carries with it a percentage of steam, or water. The remaining liquid is now more concentrated than when it entered the humidifier apparatus, i.e. by having attained a higher concentration of a solute such as, but not limited to, minerals, salts, waste components and/or mixtures thereof. Systems that create air bubbles in water are found to be advantageous in mass and temperature transfer over those systems that created fine droplets of thin films of water.

Theoretically, to maximize the efficiency of mass and temperature transfer, all of a gas stream introduced to a multi-stage bubble column humidifier flows upwardly so as to pass through a series of liquid baths, each held in their respective chamber, until the gas reaches an uppermost section of an uppermost chamber and flows through—in its entirety—into the atmosphere, or into a capturing device held thereon. As stated, it is within this cross-current flow configuration that mass and heat transfer coefficients are maximized due to a diffusion of water (in the form of a vapor, or steam, component) into the bubbles of gas. Key to this transfer is the formation of a foam or 'froth' at the location where the air bubbles are dispersed throughout the water within the chamber(s) of the bubble column humidifier. The froth, by increasing the surface area for mass and heat transfer, also increases the rate of this transfer reaction.

Any impediments to the bubble formation process will directly impact the level of foam formation. For example, the central placement of a downcomer unit in previous vapor-liquid contact apparatus restricted valuable bubble distributor, or sparger, space. Also, seen in previous apparatus, the release of a liquid stream from a liquid bath held on one stage directly on top of the foam forming in an adjacent underlying chamber dampened the froth, or foam, formation.

However, although the presence of foam increases the rate of mass and heat transfer, the overall efficiency of the bubble column humidifier will decrease if the foam (bubbles) are allowed to return to a preceding, or prior, chamber. Therefore, an overproduction of foam is not preferred. In previous apparatus, high levels of foam resulted in the direct entry of bubbles into downcomer units so as to be transported to adjacent underlying chambers, thus reducing efficiency. Furthermore, if a high level of foam contacts the porous plate of the adjacent overlying chamber, this may result in a bursting of the bubbles and release of the vaporizable component, thus also reducing efficiency.

Therefore it is desirable to have a means for controlling an over-formation of foam, and for preventing the return of any bubble component to a previous chamber. As foam formation is mainly influenced by the air superficial velocity and the height of any water gates installed in a liquid-vapor contact apparatus, such as the bubble humidifier apparatus, a means for controlling this component is important. Having a watergate that is easily adjusted is an important factor.

A downcomer unit can be used as a watergate. Downcomer units may be contiguous with the humidifier vessel itself. If the downcomer unit is contiguous with the exterior shell of the bubble column humidifier, the watergate, or any part of the downcomer, may not be easily adjusted nor replaced in case of breakage. Additionally, the height of the water gate is not only important for foam formation, but also for liquid transfer concerns. Truncated water gate designs have several inherent limitations. For example, the water gate may not provide a sufficient length so as to cause the fluid in the chamber below to back up into the water gate. This will impede the flow of the liquid, and may even cause it to re-enter the chamber from which it originated. Also, any water gate releasing its contents at a location above the water bath increases the probability of sediments from the liquid, such as salts from seawater, accumulating on the porous structure. This may foul the openings of the porous structure, such as a sparger, so as to impede the flow of a gas, such as air, and reduce the efficiency of the apparatus. If the efficiency of a humidifier is compromised, the overall efficiency of a HDH system will also suffer, and thus limit the delivery of purified water.

Recent research has been directed to the development of an effective humidifier. For example, an approach as disclosed in U.S. Pat. No. 6,919,000 provides a reduction in the thermal resistance associated with incondensable gases by using a direct-contact condenser instead of a standard, indirect contact dehumidifier. This method increases the heat transfer rates in the condenser at the expense of energy efficiency, as the energy from the humid air entering the dehumidifier is not directly recovered to preheat the seawater. Thus, although the cost of the dehumidification device is reduced, the energy costs associated with this method actually increase.

Another alternative approach as disclosed in U.S. Pat. No. 4,045,190 provides a method for regulating the flow of liquid through mass transfer columns using throttle valves responsive to a gas pressure drop or a height of a liquid. However, some bubbles may leave with the water stream; subsequently reducing the heat recovery in the humidification process.

Further to this approach, U.S. Pat. Nos. 6,250,611 and 6,575,438 both describe vapor-liquid contact apparatus for use in carrying out chemical processing which use downcomer(s) fixed with a sparger plate. However, in these two references, it is not possible to adjust the height of water level, and, most significantly, numerous bubbles may leave with the water stream.

A simple, low cost vapor-liquid contact apparatus, such as a multi-stage bubble column humidifier apparatus, providing a means to limit the loss, or return, of a vapor component so as to achieve an increased efficiency in mass and/or heat transfer, is greatly desired.

SUMMARY OF THE INVENTION

The present disclosure relates to a multi-stage bubble column humidifier apparatus comprising a downcomer unit for use in a humidification process to humidify a gas stream. Also, the multi-stage bubble column humidifier apparatus may be used in a humidification-dehumidification system for purifying a liquid such as water. Herein, the term 'multi-stage bubble column humidification apparatus' is synonymous with the term 'multi-stage bubble column humidifier apparatus'.

According to a first embodiment, the present disclosure is directed to a multi-stage bubble-column humidification apparatus comprising:

an external shell defining an interior region;
a plurality of horizontal porous structures defining vertical chambers within the interior region;
a carrier gas inlet;
a carrier gas outlet;
a liquid remnant outlet comprising a discharge siphon system;
a feed liquid inlet; and
a series of downcomer units wherein each pair of vertically adjacent chambers is in liquid communication via at least one downcomer unit;
wherein the vertical chambers within the interior region comprise at least a lowermost proximal chamber, an uppermost distal chamber and at least one mid-chamber between the proximal and distal chambers,
the lowermost proximal chamber comprises:
    the carrier gas inlet; and
    the liquid remnant outlet,
the uppermost distal chamber comprises:
    the feed liquid inlet; and
    the carrier gas outlet,
each downcomer unit comprises:
    a funnel;
    a watergate;
    a base cup downcomer;
wherein
a lower portion of the watergate is seated in the base cup downcomer and an upper portion is coupled with the funnel.

In a further embodiment, the external shell comprises:
    a column;
    an upper plate; and
    a lower plate;
wherein the upper plate and the lower plate are sealed to the column by means of an embedded O-ring.

In a further embodiment, the funnel and the watergate are not contiguous with the external shell.

In a further embodiment, the porous structure is configured to seal the water gate therein.

In a further embodiment, the seal comprises an O-ring, configured to provide an ease of adjustment or replacement.

In a further embodiment, either the porous structure of a distal or mid-chamber, or the bottom plate of the proximal chamber is configured to seal the base cup downcomer therein, so as to provide an ease of replacement.

In a further embodiment, the seal comprises an O-ring configured so as to provide an ease of adjustment or replacement.

In a further embodiment, the base cup downcomer terminates at a point below a level at which a feed liquid or liquid remnant accumulates in any of the proximal, distal or mid chambers.

In a further embodiment, the base cup downcomer is configured to distribute the feed liquid or liquid remnant to any of the proximal, distal or mid chambers in an even-flowing pattern.

In a further embodiment, the base cup downcomer is configured to collect a sediment fraction of a feed liquid or a remnant liquid entering through the feed liquid inlet, or entering through the downcomer unit, so as to prevent or reduce a fouling of the porous structures.

In a further embodiment, the liquid discharge siphon system is configured so that no gasses exit with the remnant liquid.

In a further embodiment, the chambers are configured to each have a width defined by the external shell, measured horizontally, and a height defined by the external shell, measured vertically, where the width is at least twice as great as the height.

In a further embodiment the water gate is configured so as to lengthen or shorten a passageway for liquid communication between vertically adjacent chambers.

In a further embodiment the funnel is configured to limit or eliminate an entrance of a foam or bubble component into the water gate.

In a further embodiment the plurality of porous structures is selected from the group consisting of a sieve plate, a radical sparger, a ring sparger, a spider sparger, and a wheel-type sparger.

In a further embodiment the plurality of porous structures comprise a lower porous surface and an upper porous surface wherein the lower porous surface comprises openings greater in diameter than the upper porous surface.

In a further embodiment the downcomer units are arranged along a periphery of the distal, mid, and proximal chambers in a vertical, offset pattern, or juxtaposed relationship when compared to the arrangement of the downcomer units arranged along a periphery of a vertically adjacent chamber.

In a further embodiment the feed liquid inlet is configured to receive a liquid selected from the group consisting g sea water, brackish water, flowback water, water produced during an oil or gas extraction, or mixtures thereof.

In a further embodiment, the carrier gas inlet is configured to receive a carrier gas selected from the group comprising air, nitrogen, oxygen, hydrogen, argon, carbon dioxide, or mixtures thereof.

In a further embodiment, the operation of the bubble column humidifier apparatus wherein the multi-stage arrangement allows for mass and heat transfer from the liquid stream to the air stream via the formation of two counter-flow streams.

In a further embodiment the multi-stage bubble column humidification apparatus for use in a water de-salinization or water purification system.

In a further embodiment the water gate is cylindrical, or cuboidal in shape.

In a further embodiment the funnel is conical or cylindrical in shape.

In a further embodiment the funnel is configured so as to have a diameter of 1.5 to 5 times greater than a water gate configured to have a diameter.

In a further embodiment the varying of said water gate height or length ranges from 0.1 cm to 10.0 cm.

In a second embodiment, a method of humidifying a gas by mass and temperature transfer from a liquid stream to a gas stream via the formation of two cross-flow streams comprising:
    feeding the feed liquid stream comprising a vaporizable component into an uppermost distal chamber of a multi-stage humidifier through a water gate conduit housed in a base cup downcomer to form a distal-stage feed liquid bath at a third humidification temperature, wherein the multi-stage humidifier comprises a vessel comprising a plurality of vertically spaced horizontally placed porous structures defining vertical chambers;
    feeding a first remnant of the feed liquid from the uppermost distal chamber into a mid-chamber of the multi-stage humidifier through a downcomer apparatus to form a mid-stage bath at a second humidification temperature, wherein the second humidification tem-perature is lower than the third humidification temperature, and further wherein said downcomer apparatus comprises a funnel, a water gate, and a base cup downcomer;

feeding a second remnant of the feed liquid from the mid-stage bath into a lowermost proximal chamber of the multi-stage humidifier through a downcomer apparatus to form a proximal-stage bath at a first humidification temperature, wherein the first humidification temperature is lower than the second humidification temperature, and further wherein said downcomer apparatus comprises a funnel, a water gate, and a base cup downcomer;

siphoning a third remnant of the feed liquid from the lowermost proximal chamber through a liquid remnant outlet so as to assure that no gas is included in said third remnant;

introducing the gas through a gas inlet into the lowermost proximal chamber at a point above the lowermost proximal-stage bath;

directing the gas directly from the lowermost proximal chamber through the porous structure into the mid-stage bath of the mid-chamber and bubbling the gas through the feed liquid remnant in the mid-stage bath, where the gas collects the vaporizable component in vapor form from the second remnant of the feed liquid to partially humidify the gas with the vaporizable component;

separating the mid-stage bath from the distal-stage bath by a top gas region in the mid-chamber filled with the partially humidified gas from the bubbling in the mid-stage bath prior to directing the partially humidified gas directly from the mid-chamber through the porous structure into the distal-stage bath of the uppermost distal chamber and bubbling the carrier gas through the distal-stage bath, where the carrier gas collects more of the vaporizable component in vapor form from the feed liquid to further humidify the carrier gas with the vaporizable component; and removing the humidified gas through a gas outlet from the distal-stage humidifier chamber.

In a further embodiment, the method further comprises condensing the vaporizable component from the humidified gas in a dehumidifier after the humidified gas is removed from the distal chamber.

In a further embodiment, wherein the removed humidified gas, when exiting the distal chamber, has a temperature 20° C.-30° C. higher than the temperature of a gas leaving the proximal chamber.

In a further embodiment, the gas is selected from the group comprising air, nitrogen, oxygen, hydrogen, argon, carbon dioxide, or mixtures thereof.

In a further embodiment the vaporizable component is water.

In a further embodiment the feed liquid is selected from the group comprising sea water, brackish water, flowback water, water produced from oil or gas extraction, and mixtures thereof.

In a further embodiment, the method for water de-salinization or water purification.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 shows a comparison between a bubble column humidifier as disclosed herein and that of a packed bed humidifier.

FIGS. 6a, b, and c show three variations in the design of a porous structure comprising a sparger.

FIG. 11 shows an approximate amount of bubble flow, or foam formation, at $V_{SG}$=25 cm/s and h=5 cm.

FIG. 12 shows an approximate amount of bubble flow, or foam formation, at $V_{SG}$=15 cm/s and h=5 cm.

FIGS. 13 a, b, and c show the effects that the water gate height has on the mass flow ratio effectiveness.

DETAILED DESCRIPTION OF THE EMBODIMENTS

Figure 1:
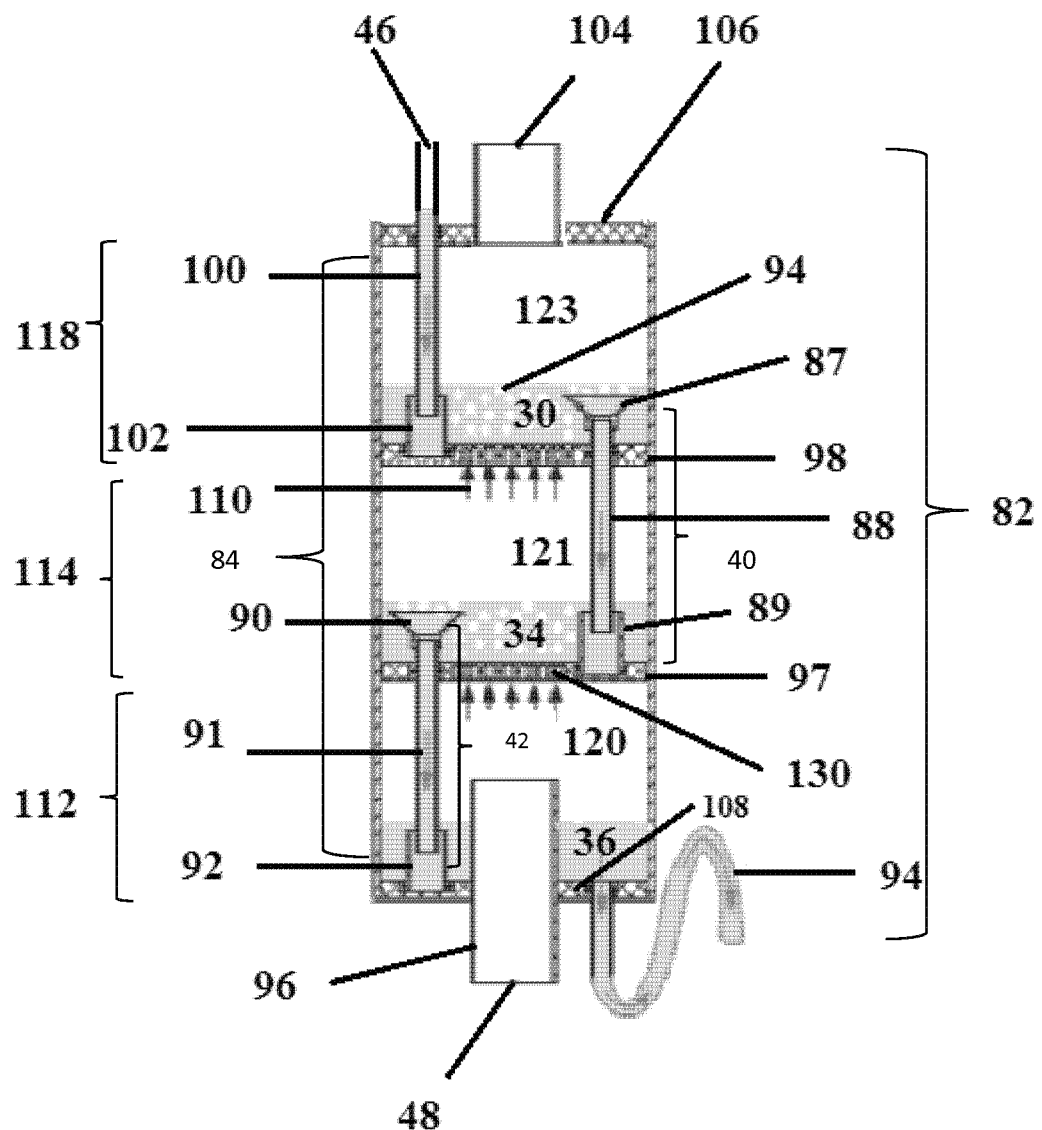
FIG. 1 shows a three-stage bubble humidifier with a series of assembled downcomer units.

The terms, first, second, third, etc., may be used herein to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures.

Further still, in this disclosure, when an element is referred to as being "on," "connected to" "flush with" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Furthermore, the dimensions of the multi-stage bubble column humidifier, as well as its individual components, presented herein are not intended to limit the scope of other embodiments, nor are the given pressure or air velocity rates to be seen as limiting to other embodiments. Embodiments comprising specific dimensions are not intended to limit a larger scale version of the same apparatus.

A downcomer apparatus for use in a vapor-liquid contact apparatus and the operation thereof is described herein. Various embodiments of the apparatus and methods may include some or all of the elements, features and steps described below.

A downcomer apparatus, as assembled, for use in a vapor-liquid contact apparatus such as, but not limited to, a multi-stage bubble-column humidifier and a contact tray apparatus. The humidifier, configured so as to efficiently humidify dry air, can be used as an integral part of a larger humidification-dehumidification system, while the contact tray apparatus, configured so as to efficiently carry out chemical processing, may also be used in a larger-scale operation. The bubble column humidifier as disclosed herein provides advantages over the prior art packed-bed heat exchanger in terms of a reduced cost, as both the equipment cost and the cost of energy for operation can be decreased. For example, the high heat and mass transfer rate between a liquid and a gas in the multi-stage bubble column humidifier enables a small design, and furthermore, the energy for the humidification process can be directly provided by the feed liquid in the humidification chambers.

The multi-stage bubble column humidifier apparatus as described herein can be used to separate pure water from a feed liquid comprising, but not limited to, seawater, brackish water and waste water. Waste water can include, but is not limited to, flowback water and water produced from oil or gas extraction/production processes. Furthermore, the multi-stage humidifier is not only able to produce fresh water, but to concurrently concentrate the volume of a waste or brine stream, resulting in a reduction of pollution, contamination, and remediation costs.

Both the contact tray apparatus and the multi-stage bubble column humidifier apparatus as disclosed herein have an external shell defining an interior region for carrying out a cross flow mass and temperature transfer process. The external shell comprises a column, an upper plate and a lower plate. Within this shell, the apparatus has a plurality of horizontal porous structures defining vertical chambers within the interior region. The horizontally-placed porous structures, sometimes referred to herein as stages, support a vapor, liquid, or vapor-liquid mixture thereon, wherein the porous structures, such as a sieve plate or sparger, comprises a plurality of openings allowing for the upward passage of a vapor or gas. In one embodiment, the chambers each have a width, defined by the external shell, measured horizontally, and a height, defined by the external shell, measured vertically, where the width is at least twice as great as the height. The apparatus also has a carrier gas inlet; a carrier gas outlet; a liquid remnant outlet comprising a discharge siphon system; a feed liquid inlet; and a series of downcomer units wherein each pair of vertically adjacent chambers is in liquid communication via at least one downcomer unit. Notably, the downcomer unit is the sole conduit configured for providing liquid communication between two adjacent chambers.

The vertical chambers within the interior region of the humidifier apparatus comprise at least a lowermost proximal chamber, an uppermost distal chamber, and at least one mid-chamber between the proximal and distal chambers. The lowermost proximal chamber comprises the carrier gas inlet and the liquid remnant outlet housed in the lower plate, while the uppermost distal chamber comprises the feed liquid inlet and the carrier gas outlet housed in the upper plate. The inlets and outlets are held within the upper and lower plates by means of O-rings, however they could also be held by other means including, but not limited to, threading within the plates. Additionally, the inlets and outlets could also be manufactured into the plates.

Each of the downcomer units comprises a funnel, a watergate and a base cup downcomer. A lower portion of the watergate is seated in the base cup and is sealed therein using an embedded O-ring. An upper portion of the watergate is coupled with the funnel, and this attachment is also secured using an O-ring. In an alternate embodiment, these components can be coupled during the manufacturing process.

The downcomer unit is positioned within a vapor-liquid contact apparatus, such as a humidifier, with the funnel portion of the downcomer unit located in one chamber, and the base cup downcomer embedded in either the porous structure, or the external shell (in the case of the lowermost proximal chamber) of an adjacent underlying chamber. The water gate portion forms a conduit from the funnel to the base cup downcomer so as to form a pathway for liquid flowing from the one chamber to an adjacent underlying chamber. The humidifier's lowermost proximal chamber, which lacks an adjacent underlying chamber, does not have the funnel portion of the downcomer unit positioned therein.

The downcomer unit is furthermore arranged within the apparatus in a peripheral and offset, or juxtaposed pattern. This offset, or juxtaposed relationship, is determined by alternating the placement of the base cup downcomer of the downcomer unit between pairs of vertically adjacent chambers. This applies to all of the chambers held in series. For example, when viewed from the top of the humidifier apparatus, the placement of one of the base cup downcomer units occurs at $180°\pm5°$ of the placement of the base cup downcomer of both the overlying and underlying vertically adjacent chambers. If more than one downcomer unit is necessitated in each chamber for liquid communication, the placement of the base cup downcomer will again be offset. For example, having two base cup downcomers placed at $180°\pm5°$ of each other in one chamber results in the juxtaposed placement of two base cup downcomers of downcomer units of an overlying or underlying adjacent chamber to be positioned at $90°\pm5°$ with respect to the two base cups arranged in the one chamber.

The design of the downcomer unit as a whole improves the structural support of the humidifier vessel, especially in those embodiments where the apparatus comprises more than four chambers, or has larger diameter designs with moderate to low stage, or porous structure spacing. Furthermore, a peripheral placement of the downcomer apparatus avoids the performance degrading effect of depositing the liquid in the center of the chamber where froth formation originates, and could subsequently be disrupted by the turbulent input of the liquid flow. It also allows for the greatest porous area on each stage so as to help achieve the desired level of foam formation. Of further note is the simplification in controlling the water level in each chamber that these units provide.

Advantageously, the downcomer unit is not irreversibly attached to the external shell of the apparatus, thus allowing for ease of exchange or repair of the individual components making up the downcomer unit itself. Most notably, as both the funnel and the watergate of the downcomer unit are not contiguous with the external shell of the multi-stage bubble column humidifier, this allows for even greater freedom in the repair or replacement of these components. Similarly, the porous structure is also easily removable, either for repair, cleaning, or replacement, due to the fact that it is also not contiguous with the external shell of the humidifier. As the design and use of the downcomer unit as disclosed herein also minimizes the risk of fouling, or plugging, of the openings of the porous structure, such as a sparger, any removal of the porous structure for cleaning will be minimal.

The bubble column humidifier apparatus itself comprises an insulating casing material. A loss of heat to the surrounding area reduces the potential of heat transfer between a liquid stream and a carrier gas, and this would consequently reduce the effectiveness of a humidifier system. Casing material may be selected from the group consisting of, but not limited to, metal, plastic, thermoplastics, (i.e. chlorinated polyvinyl chloride (CPVC)), and expanded polyethylene and mixtures thereof. In a preferred embodiment the material is an expanded polyethylene with a thermal conductivity of 0.020 W/mK-0.050 W/mK, preferably 0.030 W/mK-0.040 W/mK, most preferably 0.035-0.039 W/mK.

The apparatus is provided with an opening through which enters a cooling gas, or air, forced into the apparatus by a blower such as, but not limited to, a centrifugal blower operated by an electric motor in a conventional manner. This gas is directed upwards and through at least two porous structures installed in a vertically spaced horizontal manner so as to define at least three chambers within the multi-stage bubble column humidifier. In one embodiment, the air enters the bubble column humidifier at an ambient temperature and humidity, and is passed, or sparged through a porous structure, such as a sparger to form bubbles in a bath of a heated liquid, such as water. In this direct contact process, mass and heat are transferred simultaneously from the hot, heated water to the inherently cooler air bubbles. Then, the humid air moves upward through the overlying chambers held in series, in the same manner until reaching the carrier gas outlet. The gas is furthermore supplied at a pressure sufficient to overcome the hydrostatic heat of the liquid. As air is a much poorer conductor of heat than water, due in part to the low density of this gas (approx. $1/900^{th}$ that of water), the creation of bubbles, or thin films of air, results in the creation of a highly effective heat transfer system. This heat transfer system is much more efficient when compared to previous systems which created fine droplets of thin films of water.

As previously stated, the dimensions presented in the following embodiments are not intended to limit the scope of this disclosure.

In one embodiment, the height of each chamber of the multi-stage bubble column humidifier is 20 cm±1 cm, the height of each of the base cup downcomers, as well as the height of the funnel and watergate portions rising above the porous structure, is 1-5 cm. The width of each of the base cup downcomers is 42±5 mm and the width of the watergate is 21±5 mm. The porous structure of a vapor-liquid contact apparatus, such as a multi-stage bubble humidifier, is installed so that it forms adjacent, or subsequent, chambers within the vessel, otherwise defined as an external shell defining an interior region. It may be made of any practical material such as, but not limited to, metal, plastic, thermoplastics; (i.e. chlorinated polyvinyl chloride (CPVC)), and expanded polyethylene. In one embodiment the porous structure is a sparger having a diameter of 277±10 mm and a width of 17±5 mm, comprising a lower surface and an upper surface, wherein each surface comprises a number of openings. These openings may vary, or be consistent in their diameter throughout their respective surfaces, so as to produce bubbles of gas, also varying or set in diameter. In a preferred embodiment, the openings, or pores, located on the upper surface of the porous structure, are smaller in diameter as compared to their respective openings, or pores, located on the lower surface. The openings may comprise 0.1 to 15 percent of the total upper surface area; more preferably, the openings may comprise 0.5 to 10 percent of the total upper surface total area; most preferably, said holes may equal in total area 0.6 to 5.0 percent of the total upper surface area.

The type of porous structure utilized in the bubble column humidifier is dependent on a number of variables such as, but not limited to, the desired air bubble size and the desired air bubble amount. In one embodiment, it is desirable to obtain bubbles, or froth of a small diameter ranging from, 0.05 mm-5 mm, preferably 0.50 mm-2.5 mm, most preferably 0.75 mm-1.0 mm in diameter so as to speed up mass and heat transfer reaction rates and save valuable processing time. A finer nozzle pore (opening) size is used to prevent any liquid from penetrating back into the pores at a lower internal pressure and assure that all liquid passes through their respective water gate(s) to an adjacent chamber below. The integrity of the porous structure is important. The porous structure(s) chosen herein for the bubble humidifier are designed to perform well under conditions involving high heat and pressure. The size of the openings, along with the diameter and the thickness of the porous structure itself, are two of the criteria used to select the best porous structure chosen to withstand these conditions without cracking or breaking so as to assure that the efficiency of humidifier remains high. Also, the composition of the feed liquid will influence the selection of the porous structure due to the amount and particle size of any solids found in the feed liquid stream. In this disclosure, the porous surface area of the porous structure was chosen so as to assure the integrity of the porous structure. That is, the porous structure is configured so as to provide integrity and, additionally, a lesser chance of becoming fouled. Specific porous structures may be selected from the group consisting of, but not limited to, sieve plates, radical spargers, ring spargers, spider spargers and wheel-type spargers each comprising openings, or pores, for the passage of a carrier gas therethrough.

Figure 9:
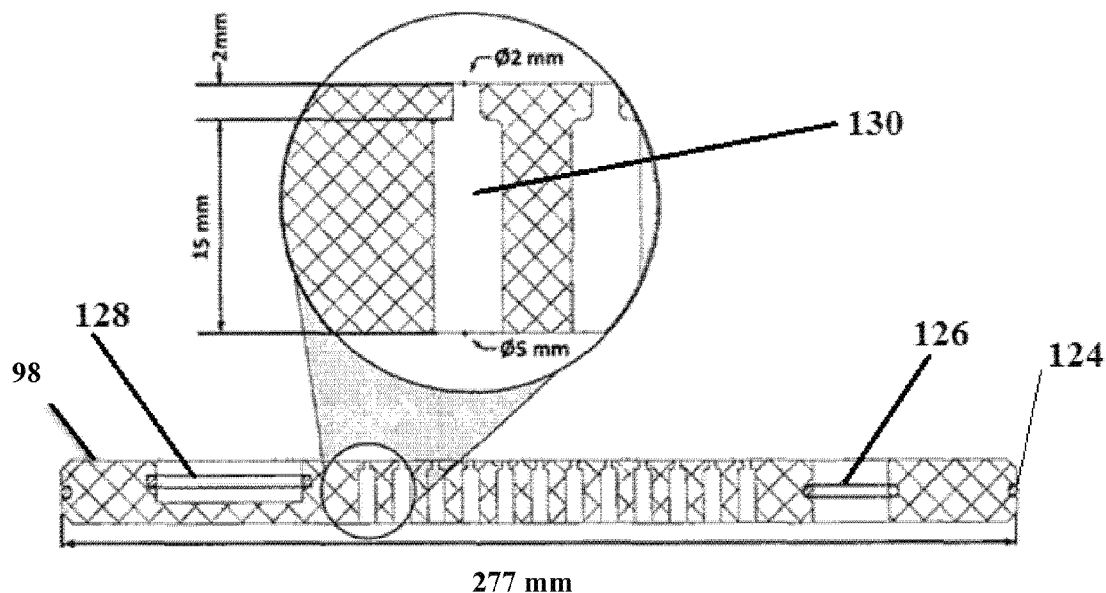
FIG. 9 shows a cross section of the porous structure's openings configured in a nozzle-like formation.

Referring now to the drawings, wherein like reference numerals designate identical or corresponding parts throughout the several views As seen in FIG. 9, the porous structure openings 130 may range in diameter from 0.5 mm to 5.0 mm, preferably 1.0 mm to 3.5 mm, most preferably 1.7 mm to 2.2 mm on the upper surface, with correlating openings on the lower surface having a diameter of for example 2.5× that of the upper surface diameter. In a preferred embodiment, when the cross section of the sparger 98 is viewed, the opening remains at the larger of the diameters for the majority of the length of the opening, as measured from the upper surface of the sparger to the lower surface of the sparger. In a most preferred embodiment, the sparger measures 17±2 mm from the lower surface to the upper surface, and comprises openings of 5.0 mm as measured from the lower surface to 2 mm below the upper surface; at this point the openings narrow to 2.0 mm so as to form a 'nozzle'-like structure. It is also within the scope of this disclosure to vary the size of the perforations in the porous structure, such as a sparger, so that within the structure itself some openings are greater in diameter than others. In one embodiment, a sparger comprising larger diameter opening ranging from 2.2 mm-5.0 mms, either on its lower, upper, or both surfaces define some chambers, while other porous structures comprising smaller diameter openings define other chambers within the same humidifier vessel. These variations in pore size may assist in maintaining desired air pressures and water levels within the multi-stage bubble column humidifier. Furthermore, the diameters of the opening may be altered by the inclusion of a 'sliding plate' so as to reduce the size of the pores, or by changing the sparger completely.

It is desired that the bubble component generated by the porous structure forms 'froth'. This froth commonly forms in a bubble column humidifier at a location where air bubbles are dispersed throughout the water. The level of froth formation must be closely monitored, as although this foam increases the surface area so as to increase the rate of transfer, it will also hamper the efficiency of the apparatus, such as the humidifier, due to the propensity of the bubble, or foam component to re-enter an adjacent underlying chamber. The two main factors causing the foam formation in the multi-stage bubble column humidifier as disclosed herein are the air superficial velocity and the water gate height.

Advantageously, the water gate height of the downcomer unit as disclosed herein may be changed out quickly. This is due in part to the use of an O-ring as a means of sealing the watergate within both the porous structure and the base cup downcomer. If a high level of liquid is necessitated in a chamber, this will increase the probability of the liquid 'backing up' in the watergate so as to re-enter the bath from where it originated. This back-up can be avoided by installing a watergate with a longer, more appropriate length. The watergate may also be changed, or adjusted, so to place the funnel portion at a height so as to further restrict a bubble component from entering into said water gate.

Furthermore, the funnel, of the downcomer unit is configured so as to form a 'lip', or weir. This configuration assures that bubbles carrying both gas and an evaporated liquid such as steam (a vaporizable component of one embodiment wherein the feed liquid is water), are excluded from entering the water gate and travelling downwardly and re-entering a chamber that it had already occupied. As there is a lesser gas component re-circulating, a greater efficiency in mass and temperature transfer is achieved. In one embodiment, the funnel comprises a cylindrical or conical shape. The funnel may vary in circumference to account for the variations in a bubble, or froth components' amount and size. In a preferred embodiment, the diameter of a funnel, at its widest circumference, is 1 to 10 times that of a diameter of a water gate to which it is coupled. In a most preferred embodiment, the diameter of the funnel at its widest circumference is 1.5 to 5 times that of the diameter of the water gate to which it is coupled.

The design of the base cup downcomer is key in preventing the fouling of the sparger. This is accomplished by securing the base cup downcomer to the porous structure at the bottom of a lower vertically adjacent chamber so as to initially receive the remnant fluid from a preceding adjacent overlying chamber. The design of the base cup allows for the settling of any sediment inside the cup, rather than on the pores of the porous structure. The base cup downcomer design has the additional intent of slow the outflowing of fluid from the water gate so as to provide a substantially uniform distribution of liquid to a bath forming in a chamber. The turbulence of the outflowing fluid may be further modified with any changes in length or width of the watergate so as to influence laminar flow throughout the conduit. By varying the length, or width, a greater or lesser amount of foam formation and/or foam dampening will occur, thus further providing means to regulate foam formation and increase humidifier efficiency.

Further still, it is within the scope of this disclosure to carry out a multi-extraction process, wherein a remnant liquid removed via a siphon system of one multi-stage bubble humidifier apparatus now becomes the input feed liquid of a secondary multi-stage bubble humidifier apparatus so as to further increase heat and mass exchange.

Figure 3A:
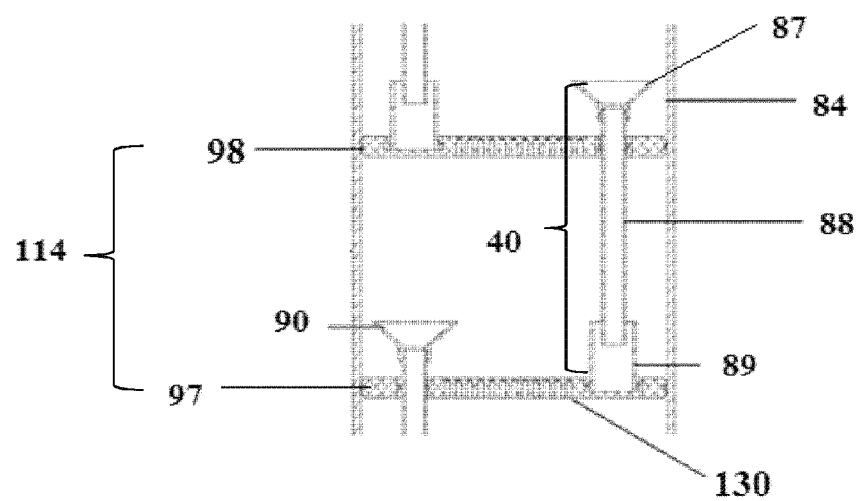
FIG. 3a shows an assembled downcomer unit installed in a mid-portion of a multi-stage bubble column humidifier and a porous structure comprising perforations.
Figure 3B:
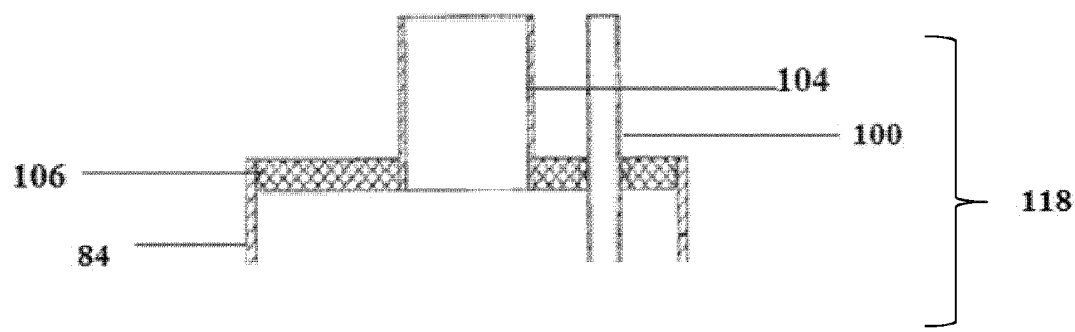
FIG. 3b shows a top portion of the uppermost distal chamber of the multi stage bubble column humidifier apparatus.
Figure 3C:
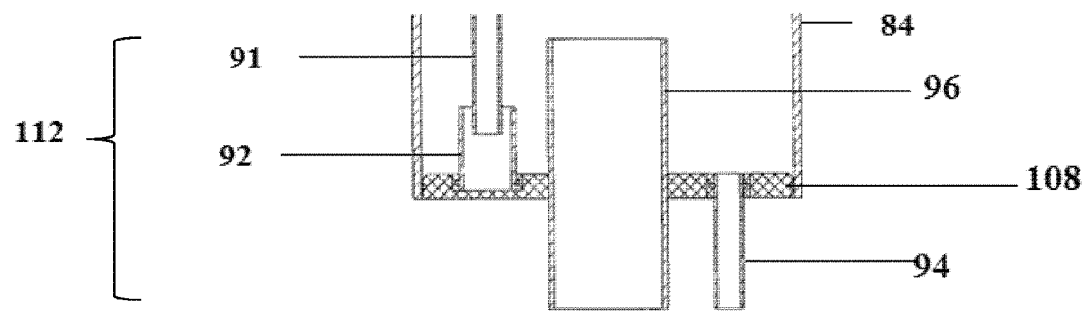
FIG. 3c shows a base portion of the lowermost proximal chamber of the multi stage bubble column humidifier apparatus.

The multi-stage bubble column humidifier as disclosed herein has a series of downcomer units wherein each pair of vertically adjacent chambers is in liquid communication via a downcomer unit. FIG. 3a illustrates the arrangement of a funnel 87 water gate 88 and base cup downcomer 89, so as to form a downcomer unit 40 in a mid-chamber 114 of a multi-chamber bubble column humidifier. This arrangement provides liquid communication between adjacent vertical chambers. The bottom portion of the water gate 88 is installed in the base cup downcomer 89 so as to force a gas, or air stream, through to an overlying adjacent chamber via the bubble distributor, or sparger, holes 130 instead of via the water gate 88. An upper portion of the water gate 88 and connects with a cylindrical or conical funnel 87 seated flush on top. The base cup 89 is secured to the bottom of mid-chamber 114 in a porous structure 97, such as a sparger. FIG. 3b shows a portion of the uppermost distal chamber 118 of a multi-stage bubble humidifier apparatus comprising an upper plate 106 of the external shell 84, a carrier gas outlet 104, and a feed liquid inlet 100. FIG. 3c shows a portion of the lowermost proximal chamber 112 of the multi-stage bubble humidifier 82 comprising a lower plate 108 of the external shell, 84, a carrier gas inlet 96, a liquid remnant outlet 94, said outlet further comprising a discharge siphon system (not shown), and a base cup downcomer 92 holding water gate 91 therein.

The dimensions presented in the following embodiments are not intended to limit the scope of other embodiments, nor are the given pressure or air velocity rates to be seen as limiting to other embodiments.

In one embodiment, the humidifier comprises a cylindrical column with a height of 1.5 m±10 cm and a diameter of 0.25 m±5 cm, having an upper plate, and a lower plate fixed to the column so as to create an external shell defining an interior opening. At least one sparger, having openings configured so as to form a nozzle, is placed horizontally within the vessel so as to form vertical chambers therein. Operational parameters of this humidifier process include a watergate height of 1 cm-5 cm and a gas superficial velocity greater than or equal to 20 cm/sec, preferably greater than 30 cm/sec, most preferably greater than 35 cm/sec. FIG. 11, is a representation of the amount of foam that can form in a chamber when the humidifier is operated within these parameters. The resultant foam is approximately 11±2 cm, which overwhelms any downcomer unit held in the chamber(s). FIG. 12 is a representation of the amount of foam that can form in a chamber when the humidifier is operated within the parameters of a watergate height of 5 cm and a gas superficial velocity of less than 20 cm/sec. The results indicate that very little to no foam formation occurs, and it does not overwhelm any downcomer unit held in the chamber(s). This is attributed to water accumulating over the sparger to a greater extent than before.

Nevertheless, if the water gate height is reduced to less than 2.6 cm, foaming will occur at a superficial velocity of 15 cm/s. Dependent on the actual dimensions of the bubble humidifier, and concurrently the height of the foam, the water gate height may be adjusted, or changed, in order to either increase its length or decrease its length by 0.50 cm-100 cm, preferably 0.75 cm to 50 cm, most preferably 1.0 cm-10.0 cm. The use of an O-ring seal allows for any adjustments to take place quickly, and with little effort. In one embodiment, the water gate may be exchanged out, or replaced, entirely, while in a further embodiment, the water gate comprises an adjustable, telescoping design. Generally, if the water gate height is doubled from an initial value, the air velocity should also increase by a factor of 1.5 so as to achieve foam formation. FIGS. 13a, b, and c shows the effect of the water gate height at different mass ratios on the humidifier's effectiveness. The following boundary conditions exist for FIGS. 13 a, b, and c: Temperature$_{a,i}$=34.2° C., $\varnothing_{a,i}$=55%, T$_{w,i}$=63.1° C.; P=101.3 kPa; single-stage. If the bubble column humidifier is operated at a relatively high air superficial velocity, the humidifier is slightly affected by the height of the water gate as shown in FIG. 13a wherein V$_{SG}$=25 cm/s and FIG. 13b wherein V$_{SG}$=20 cm/s. At these two superficial velocities, foam is formed in the bubble column which increases the height of the water level and the gas holdup [U. Parasu Veera, K. L. Kataria, and J. B. Joshi, "Effect of superficial gas velocity on gas hold-up profiles in foaming liquids in bubble column reactors" *Chemical Engineering Journal;* 99.1 2004, pp 53-58. Incorporated herein by reference in its entirety.] Therefore, with a higher water level, the time and surface of contact are increased enhancing heat and mass transfer. However, at low air superficial velocity, there is a drop in the effectiveness at a height of 5 cm as shown in FIG. 13c since in this case there is no foam formation. Therefore, this illustrates that foam is desired so as to increase the heat and mass transfer, but it is not desired for the bubbles, or foam itself, to enter into the water gate so as to allow the air component to re-enter an originating or preceding chamber.

A multi-stage bubble-column humidifier apparatus 82 with three chambers 118, 114, 112 is illustrated FIG. 1. The apparatus comprises an external shell 84 defining an interior region and a plurality of horizontal porous structures 97, 98 defining vertical chambers 118, 114, 112 within the interior region. In further embodiments, more or fewer humidification chambers can be joined, or linked in series, as described below, for carrying out the humidification process. FIG. 1 also illustrates how a liquid 46 and a gas 48 stream achieve a cross-current flow within the bubble column humidifier apparatus so as to carry out a humidification process to humidify a gas stream. This process, as well as the components of the humidifier, are outlined below:

A feed liquid 46 containing dissolved components is fed from a feed-liquid source, including, but not limited to, an ocean, pond, storage tank, or tap into an uppermost, distal chamber 118 of the humidifier 82, via a feed liquid inlet 100 having a lowermost portion housed in a downcomer 102 wherein the feed liquid 46 forms a bath 30 contained within the chamber 118. An upper most plate of the external shell 106 defines the top of the humidifier vessel 82, and holds an upper- to mid-portion of the feed liquid inlet 100 sealed within an uppermost portion of the external shell 106. In a first embodiment, the feed liquid 46 is fed into the distal chamber 118 and a vaporizable component, such as water, of the feed liquid 46 is vaporized into a carrier gas 48 that bubbles 94 through the bath 30, as further described below. As the base cup downcomer 102 housing the lowermost portion of the feed liquid inlet 100 overfills its capacity, the liquid 46 over flows the base cup 102 and flows over a porous structure 98 until the liquid 46 level forming the liquid bath 30 rises so as to reach and flow into an uppermost portion of a downcomer unit 40 comprising a conical or cylindrical funnel 87 so as to be collected therein. The funnel 87 has a lip, or weir, configured so as to allow liquid to enter, but restrict the entrance of any vapor or gas, in the form of a bubble 94, foam or froth component, from entering into watergate 88 of downcomer unit 40 and re-entering mid-chamber 114, a chamber that the vapor, or gas had previously occupied. The first feed liquid remnant that is able to breach the weir formed by the funnel 87 is now conducted, via watergate 88 to a base cup downcomer 89. As base cup downcomer 89, housing a lowermost portion of watergate 88, overfills its capacity, the liquid 46 over flows the base cup 89 and flows over a second porous structure 97 forming a mid-chamber bath 34. This bath 34 continues to rise until the liquid 46 level forming the liquid bath 34 reaches and flows into an uppermost portion of a downcomer unit 42 comprising a conical or cylindrical funnel 90 so as to be collected therein. The funnel 90 is also configured so as to form a lip or weir to restrict the entrance of any vapor or gas, in the form of a bubble 94, foam or froth component, into a watergate 91, but to allow a second, more concentrated remnant of the feed liquid 46 comprising further-concentrated dissolved components to be fed from the mid chamber 114 via downcomer apparatus 42 in the same manner as described above, into a lowermost proximal chamber 112, in which the second remnant of the feed liquid 46 forms another bath 36. A lowermost portion of the external shell 106 holds a mid-portion of the carrier gas inlet 96 sealed within. Although the carrier gas 48 enters humidification chamber 112 via carrier gas inlet 96, the carrier gas 48 is released above the level of the second remnant liquid bath 36 and no bubble 94 formation occurs within this remnant bath 36. The remnant of the feed liquid 46, which can now be in the form of a cold brine, is removed from the first-stage humidification chamber 112 via a siphon system conduit 94 so as to assure that no carrier gas 48 leaves with the remnant of the feed liquid 46. In one embodiment, the remnant of the feed liquid 46 is removed to an area such as a brine storage reservoir, while in an alternative embodiment the remnant liquid enters a secondary multi-stage bubble humidifier vessel 82 via a secondary water inlet water gate 99 so as to undergo further mass and temperature cross flow transfer and concentration.

The temperature of the feed liquid is reduced from chamber-to-chamber, in part, via the energy used for vaporization of the vaporizable component from the feed liquid at each stage into the carrier gas. Accordingly, the temperature of the feed liquid can drop by approximately 30% to 50% across each stage; preferably 35% to 45%.

Prior to and concurrent with the introduction of the feed liquid 46 to the bubble humidifier apparatus 82, a cool, dry carrier gas 48 is introduced to humidification chamber 112, and subsequently flows through the humidifier vessel 82 from chamber to chamber so as to flow from 112 to 114; and 114 to 118 prior to exiting the uppermost distal chamber 118 via a carrier gas outlet gate 104. The flow of the carrier gas 48 within the chambers, as well as within the multi-stage bubble humidifier as a whole, is illustrated with arrows 110. The carrier gas 48 can be selected from the group consisting of, but not limited to, ambient air, carbon dioxide, hydrogen, argon, nitrogen, oxygen, and/or mixtures thereof. The chosen carrier gas 48 can initially be fed into the lowermost proximal chamber 112 via a pressurized air blower pump feeding into a carrier gas inlet, or reservoir 96 sealed within the lowermost portion of the external shell 106. The carrier gas 48 fills a gas region 120 inside the lowermost proximal chamber 112 and flows through a porous structure, 97, such as a sparger, into the bath 34 of the mid-chamber 114 in the form of bubbles 94. It is within this bath 34 wherein the carrier gas 48 is heated and humidified with the heat and humidification provided by the feed liquid 46. The vaporizable component, such as water, of the feed liquid 46 vaporizes into the bubbles 94 at the gas-liquid interface of the bath 34 and bubbles 92. The bubbles 92 flow up through the bath 34, gaining thermal energy and also acquiring a vaporizable component (in vapor form) from the bath 34 until the carrier gas 48 enters the top gas region 121 above the bath 34 and proceeds through the porous structure 98 into the bath 30 of the uppermost distal chamber 118 in the form of bubbles 94. It is within this bath 30 wherein the carrier gas 48 is further heated and humidified with the heat and humidification provided by the feed liquid 46. A second vaporizable component, such as water, of the feed liquid 46 vaporizes into the bubbles 94 at the gas-liquid interface of the bath 30 and bubbles 94. As previously, the bubbles 94 flow up through the bath 30, gaining thermal energy and also acquiring a vaporizable component (in vapor form) from the bath 30 until the carrier gas 48 enters the top gas region 123 above the bath 30 and proceeds through a carrier gas outlet 104. The now humidified gas, upon exiting the uppermost proximal chamber, has a temperature 20° C.-30° C. higher than when it entered the lowermost distal chamber. It may be collected, or flow into the atmosphere. If collected, it may be subjected to dehumidification in a dehumidifier, as part of a HDH-desalinization system.

It should be noted that porous structures 97, 98 comprise a multiplicity of perforations 130 configured so as to provide 'nozzle' openings. These openings pass the carrier gas 48 upwardly through their respective chambers at a desired pressure and velocity. Also, in terms of liquid flow-through, or weeping, if a pressure drop occurs on the carrier-gas (bottom) side of the bubble generator 98 the liquid has a high probability of weeping. This is due to the fact that pressure is a strong function of the height of the bath 30, 34 since the hydrostatic height of the bath 30, 34 needs to be overcome by the gas 48 to keep the bath liquid from "weeping" through the porous structure 98 to an underlying chamber. One advantage to maintaining the low height of each of the baths is the reduced electricity consumption by a gas-moving device (blower) due to the decreased pressure drop. Maintaining the low height of the baths 30 and 34 is feasible in this context because the characteristic dimension of heat transfer is of the order of a few millimeters.

Figure 2:
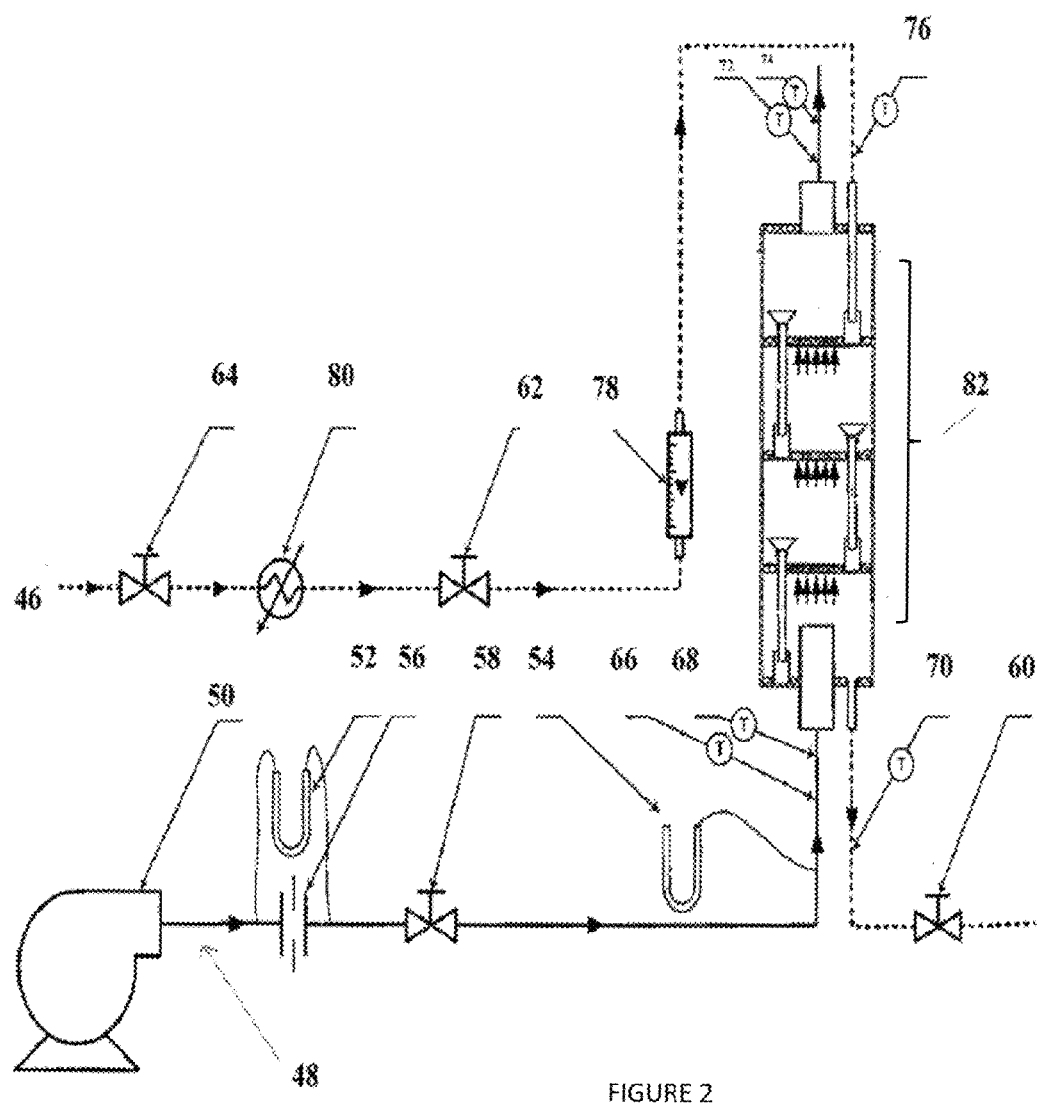
FIG. 2 shows a representation of a humidification system.

In a preferred embodiment, chambers formed in accordance with this disclosure comprise downcomer units peripherally arranged around said porous structure so that the funnels and downcomers of adjacent or sequential overlying or underlying chambers are aligned at 180°+/−5° of each other as illustrated in FIGS. 1, 2, and 3a. This juxtaposed positioning, along with the peripheral arrangement is preferred in order to off-set any turbulence which might be created when liquid 46 flowing out of the downcomer 86 enters into a forming bath 30, 34, 36. The side or peripheral placement also maximizes the area available for bubble distribution. It should be understood that downcomer apparatuses 40 and 44 are defined herein so as to show their juxtaposed and stage/chamber-specific location in said multi-stage bubble column humidifier, however, the downcomer apparatuses have the same components and design and may be used interchangeably as desired. In a further embodiment, more than one downcomer apparatus may be installed in each chamber, so that they are 90°+/−5° from each other and offset 90°+/−5° from those downcomer units in liquid communication with an adjacent overlying or underlying chamber.

FIG. 2 shows a schematic diagram of a humidification system. The system includes an air blower 50, an instant water heater 80, and a multi-stage bubble column humidifier vessel 82. A stream of air 48 is delivered to the bubble column humidifier 82 by an air blower 50. In a most preferred embodiment, an 800 W blower with a maximum volumetric flow rate of 4.5 m$^3$/min is used. The air 48 is humidified and heated up in the bubble column humidifier 82 by direct contact with a water stream 46, then leaves from outlet gate 104. The liquid stream 46 is supplied to the entrance of water gate 99 either directly from a source such as a sea, ocean, ground water, wastewater, or other body of water, or by pumping from a tank holding said source, through a liquid feed conduit such as a ½" CPVC pipe (not shown). The water stream 46 undergoes prior heating using an instant water heater 80. In a most preferred embodiment, the heater has a maximum power of 7.5 kW and is optionally supported by a proportional-integral-derivative controller (PID controller) (not shown) in order to provide a constant temperature for the water stream 46. The level of the bath of water found on each stage may be adjusted by varying the rate of water inlet flow, and also by varying the pressure of the air flowing upwards through the bubble generators.

There are two counter-flow streams in the humidifier 82. One stream comprises a hot saline water stream 46 and a second stream is a moist air stream 48 that comes from ambient air through an air entrance 96. In the humidifier 82, mass and heat are transferred simultaneously from the saline water stream 46 to the air stream 48.

At the bottom of the humidifier vessel 82, the remnant liquid 46, such as water leaves the humidifier 82 through a siphon system 94 so as to assure that there is no air, or gas 48 leaving with the remnant of the liquid stream 46. In one embodiment, the remnant water is a brine wherein said brine may comprise a cooler, or cold, temperature when compared to the temperature of the initial liquid feed stream. Further to this, a multi-extraction process using the apparatus and methods herein may be used to further increase heat recovery, in that the remnant water brine of one humidification process may form the feed liquid of a further humidification process.

The apparatus and process as disclosed may further comprise equipment or steps for condensing the vaporizable component from the humidified carrier gas in a dehumidifier after the humidified carrier gas is removed from a final or second humidifier chamber. Both the humidifier and dehumidifier may be part of a humidification-dehumidification-desalinization system for the production of fresh water.

In determining the effectiveness of a humidifier—for use in for a HDH-system-comprising the downcomer units, several parameters need to be considered. Specific to the efficiency of the bubble humidifier itself are those parameters such as, but not limited to, the air superficial velocity, the mass flow rate ratio, the number of stages, the watergate height, the porous structure profile, and insulation of the apparatus. Any efficiency improvement in these parameters will increase the efficiency of the humidifier, and furthermore increase the overall performance of the HDH system as well. In order to evaluate the effectiveness and performance of the bubble column humidifier of this disclosure, an energy-based effectiveness definition proposed by Narayan et al. was used. [G. Prakash Narayan, Karan H. Mistry, Mostafa H. Sharqawy, Syed M. Zubair, and John H. Lienhard, "Energy Effectiveness of Simultaneous Heat and Mass Exchange Devices". *Frontiers in Heat and Mass Transfer* 1.2 (2010) pp. 1-13 Incorporated herein by reference in its entirety.] Namely, the equation that was used to give the effectiveness of the multi-stage bubble column humidifier is: $\epsilon_n=1-(1-\epsilon_1)\cdot C^{n-1}$ where $\epsilon$ is the energy based effectiveness and C is the heat capacity.

In Table 1, the pressure losses and humidifier effectiveness are listed at different mass flow rate ratios. These data are obtained from the three-stage bubble column humidifier at Ta,i=$T_1$=34.2° C.; Øa,i=Ø1=55%; Tw,i=$T_{10}$=63.1° C.; P=101.3 kPa; h=1 cm and VSG=25 cm/s.

TABLE 1

Experimental data for a Three-chamber Humidifier

| Mass flow rate ratio, m r [—] | Pressure losses, $P_{losses}$ [kPa] | Effectiveness, $\epsilon_H$ [%] |
|---|---|---|
| 2 | 0.91 | 87.6 |
| 4 | 0.91 | 80.0 |
| 6 | 0.91 | 88.9 |

| Parameter Definition | Value |
|---|---|
| T1 temperature of air entering the system | 34.2° C. |
| T10 temperature of water entering the humidifier | 63.1° C. |
| Ø1 relative humidity of air entering the system | 55% |
| $P_H$ humidifier pressure | 101.3 kPa |
| $\dot{m}_{da}$ mass flow rate of dry air | 0.1 kg/s |
| Pr compressor pressure ratio | 1.5 |
| $\epsilon_D$ dehumidifier effectiveness | 90% |
| $\epsilon_{HX}$ heat exchanger effectiveness | 85% |
| $\eta_c$ compressor efficiency | 78% |
| $\eta_t$ turbine efficiency | 85% |
| $\Delta P_H$ pressure drop across the humidifier | 0.91 kPa |
| $\Delta P_D$ pressure drop across the dehumidifier | 0.5 kPa |
| $\Delta P_{HX}$ pressure drop across the heat exchanger | 0.5 kPa |

Air superficial velocity $V_{SG}$ is defined as the ratio of the volumetric flow rate of the air to the cross sectional area of the bubble column ($A_{column}$), [Nigar Kantarci, Fahir Borak, Kutlu O. Ulgen, "Bubble column reactors" *Progress Biochemistry* 40.7 (2005) pp. 2263-2283. A. A. Mouza, G. K. Dalakoglou, S. V. Paras "Effects of liquid properties on the performance of bubble column reactors with fine pore spargers" *Chemical Engineering Science* 60.5 (2005), pp. 1465-1475. Incorporated herein by reference in their entirety.], while the Mass Flow Rate ratio is defined as the mass flow rate of the water stream to the mass flow rate of the air stream.

Figure 4:
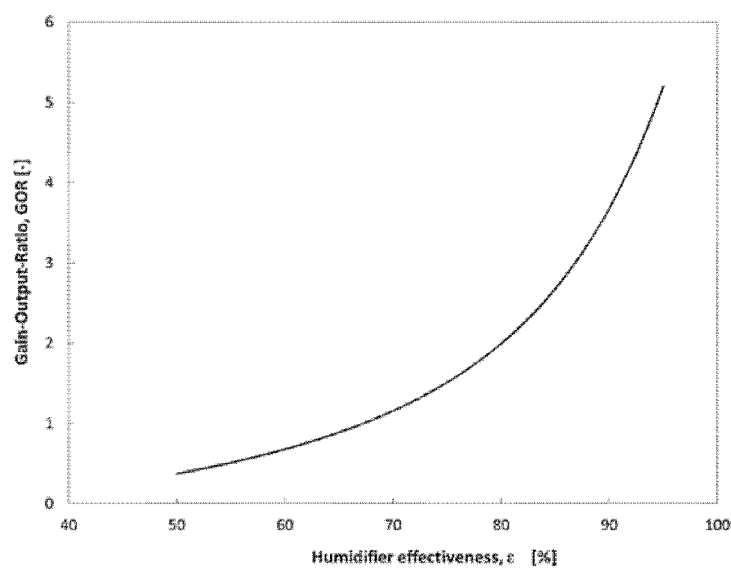
FIG. 4 shows a relationship between the humidifier's effectiveness and the Gain-Output-Ratio (GOR) of the Humidification Dehumidification Desalination (HDH) system.

The bubble column humidifier efficiency based on data for bubble columns given in open literature, the heat-transfer coefficient in a multi-stage bubble-column condenser is estimated to be 7 kW/m2K. This heat-transfer coefficient is comparable to, if not higher than, film condensation of steam. The higher energy recovery can be maintained using this multi-staging technique, thus reducing the overall cost of the system, as the energy cost and the equipment cost are both reduced. The advantages of the humidifier of this disclosure include a high mass and heat transfer rate within a small, compact humidifier. In addition to its high effectiveness, the design results in lowered economic costs, minimized time of fabrication, and also minimized time of installation. Of further note is the simplification in controlling the water level in each chamber that this apparatus provides System parameters used to evaluate the performance of the multi-stage bubble column humidifier apparatus in a humidification-dehumidification (HDH) cycle include the Gained-Output-Ratio (GOR), Vapor productivity ratio (VPR), Specific heat input (SHI), Energy Effectiveness, and Heat Capacity Rate Ratio. GOR measures the performance of a thermal desalination plant. It is defined as the ratio of the enthalpy of vaporization of the produced water to the heat input to the system. Also, GOR is a function of two system parameters; the vapor productivity ratio (VPR) and the specific heat input (SHI). VPR is defined as the ratio of the produced water rate to the rate of compressed water vapor at the humidifier exit in the system. SHI is defined as the ratio of the heat input to the system to the rate of compressed water vapor at the humidifier exit. FIG. 4 shows the relationship between the gain output ratio GOR [-] and the percentage of humidifier effectiveness ($\epsilon$), i.e. the effect of the humidifier effectiveness on the GOR of the HDH system. Energy Effectiveness for adiabatic heat and mass exchange devices is defined as the ratio of total enthalpy rate difference ($\Delta \dot{H}$) to the maximum possible total enthalpy rate difference ($\Delta \dot{H}_{max}$). Depending on which stream has the maximum heat capacity rate, the maximum possible change in total enthalpy rate can be of either that of the moist air or the water stream. And, in this work, the Heat Capacity rate ratio for the heat and mass exchange devices is defined as the ratio of the maximum possible change in the total enthalpy rate of the cold liquid stream to the maximum possible change in the enthalpy rate of the hot liquid stream FIG. 5 shows a comparison in effectiveness between the multi-stage bubble column humidifier and a multi-packing packed bed column carried out by Narayan et al [G. Prakash Narayan, Maximus G. St. John, Syed M. Zubair, and John H. Lienhard V. "Thermal design of the humidification dehumidification desalination system: An experimental investigation". International Journal of Heat and Mass Transfer 58 (2013), pp. 740-748. Incorporated herein by reference in its entirety.] The following boundary conditions exist for FIG. 5: Temperature$_{a,i}$=33° C., $\theta_{a,i}$=40%, $T_{w,i}$=60° C.; P=101.3 kPa; $m_r$=2.8. The comparison is conducted under similar conditions. The volume of each packing block in the packed bed humidifier is 0.07 m$^3$, whereas the volume of each stage in the multi-stage bubble column humidifier is 0.012 m$^3$. Even with the lower volume, the multi-stage bubble column humidifier shows a high performance when compared with the packed bed humidifier. Notably, even a three-stage bubble column humidifier has a higher effectiveness than that of a five-packing-block packed bed humidifier; (0.036 m$^3$ bubble column humidifier compared to a 0.35 m$^3$ packed bed humidifier). This translates to an effectiveness of 85% as compared to the 76% effectiveness achieved by the five-packing-block packed bed humidifier. Moreover, the multi-stage bubble column has lower volume, which translates to a reduction in manufacturing costs.

Example 1

A humidifier having the following structural features, as well as an insulator comprising expanded polyethylene with a thermal conductivity of 0.034 W/m·K, is operated so as to determine its efficiency:

Frame

The column of the exterior shell of the multi-stage bubble column humidifier is constructed out of a 277 mm±50 mm Plexiglas pipe which is a transparent thermoplastic material having a thermal conductivity of 0.19 W/mK. This material allows visibility inside the column during the process. Also, due to its low thermal conductivity, heat losses from the system are minimized. Both the upper plate and the lower plate of the exterior shell are made from 18 mm±5 mm thick chlorinated polyvinyl chloride (CPVC), and are fitted to the column so as to respectively define the top of uppermost distal chamber and the bottom of the lowermost proximal chamber. Both plates are furthermore sealed to the column by means of an embedded O-ring. The humidifier chambers may each have a width, measured horizontally, and a height, measured vertically, wherein the width is at least twice as great as the height for an increased efficiency of mass and heat transfer during the cross flow of a liquid and a gas.

Sparger

The sparger, or perforated plate, is made of a PVC sheet, 18 mm thick. Three different configurations for the sparger have been tested as shown in FIGS. 6a, b and c. These three spargers differ in their number of holes, pitch size and open area ratio wherein the open area is the ratio between the total area of the holes and the total sparger area. Table 2 shows the configuration parameters for each sparger.

Figure 7:
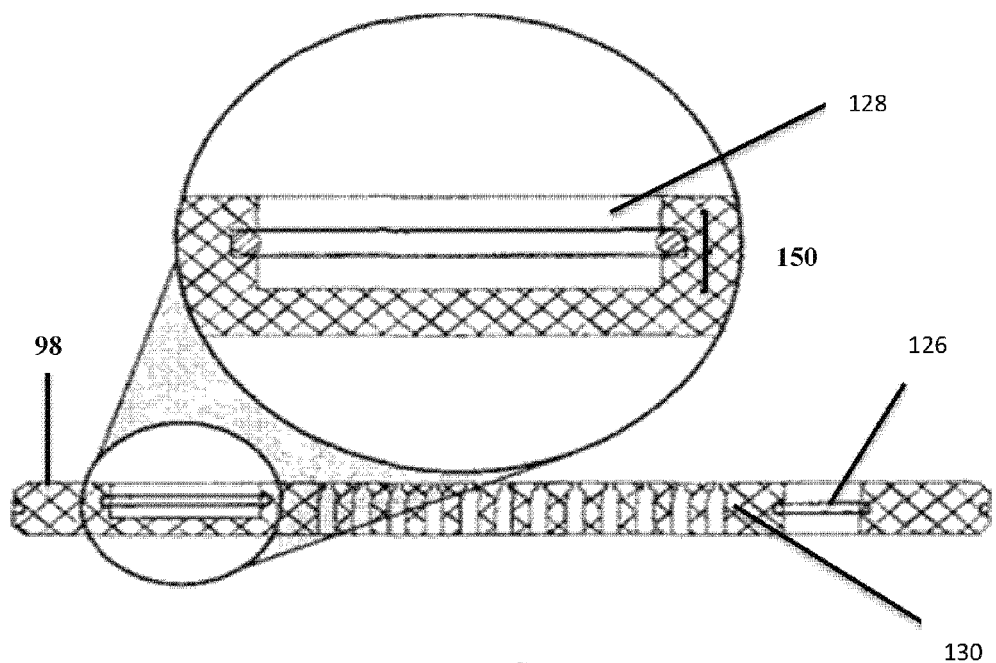
FIG. 7 shows a base cup downcomer holder comprising an embedded O-ring.

During testing, sparger 6c encountered efficiency issues due to a water leakage through the boundary openings. The leakage was attributed to the shear stress encountered near the frame of the column which resulted in a lower air velocity at that location. Sparger 6c is not considered a preferred embodiment in this disclosure. FIG. 7 shows the effect of the sparger profile on the humidifier effectiveness at different mass flow rate ratios. It can be concluded that the humidifier effectiveness is somewhat affected by the sparger profile as the effectiveness of sparger 6a is slightly higher (2.5%) than that of sparger 6b. However, pressure losses in sparger 6a were found to be much higher (more than 400%) when compared to sparger 6b. This is attributed to the reduced number of holes which translates into a higher air jet velocity through the holes, resulting in a higher dynamic pressure loss. For this reason sparger 6b was selected for the testing of the downcomer apparatus.

TABLE 2

| | | Sparger profile | | | |
|---|---|---|---|---|---|
| Sparger size | Sparger diameter; mm | Hole diameter; mm | Open area ratio (%) | Number of holes | Pitch |
| a | 277 | 2 | 0.68 | 130 | 20 |
| b | 277 | 2 | 2.22 | 425 | 10 |
| c | 277 | 2 | 2.71 | 520 | 10 |

Figure 10:
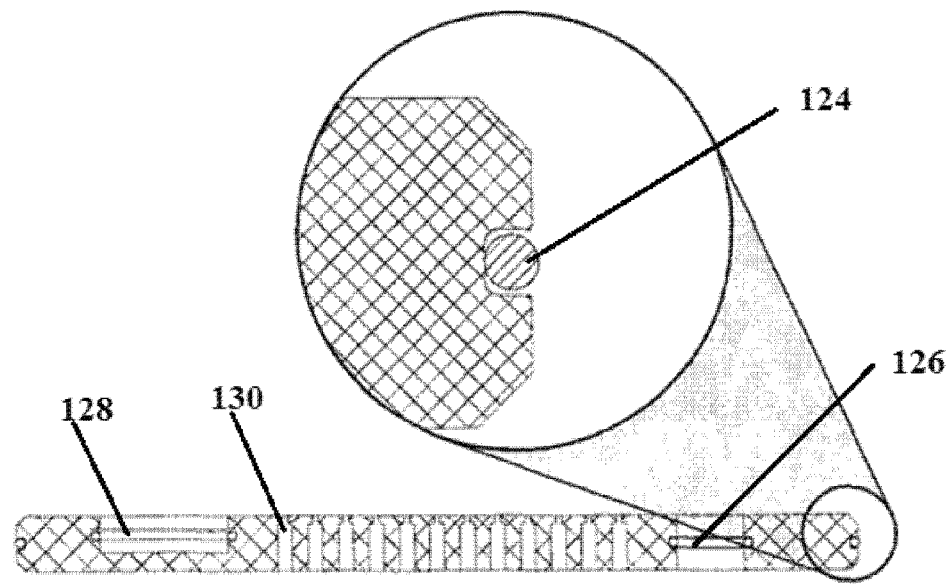
FIG. 10 shows an embedded O-ring around a porous structure so as to seal it within the external shell defining an interior region of the multi-stage bubble column humidifier.

FIG. 9 illustrates how the openings 130 are designed in a way to reduce the dynamic pressure drop. The diameter of the holes extends 5 mm from the entrance, until 2 mm before the upper surface of the sparger. Then, the diameter of the hole narrows to 2 mm until the upper surface of the sparger. This forms what is termed a 'nozzle' of the sparger. The sparger is fitted in the column by an embedded O-ring 124 around the sparger 98 as shown in FIG. 10. The O-ring 124 and groove design were selected according to MARCO RUBBER & PLASTIC PRODUCTS, INC standards [Standard AS568 USA O-Ring Sizing Chart. MARCO RUBBER & PLASTIC PRODUCTS, INC., Industrial Groove Design Charts. MARCO RUBBER & PLASTIC PRODUCTS, INC Incorporated herein by reference in their entirety.] Both prevention of air and water leakages between the stages, or between the stages and the surroundings, along with an ease of installation and repair of the device is are obvious advantages provided by the O-ring. [Standard AS568 USA O-Ring Sizing Chart. MARCO RUBBER & PLASTIC PRODUCTS, INC. Incorporated herein by reference in its entirety.]

FIG. 7 shows the sparger 98 furthermore includes a holder 150 for the base cup downcomer, which is sealed using an embedded O-ring 128.

Figure 8:
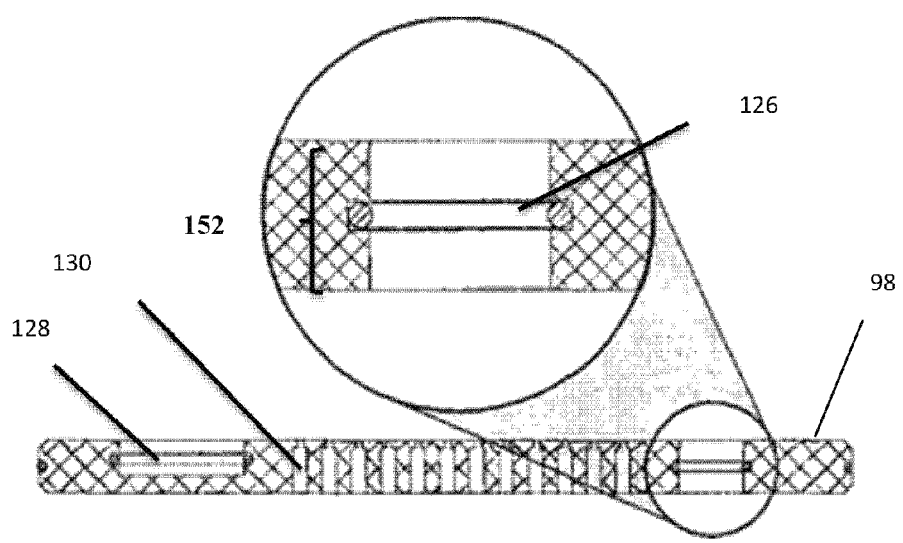
FIG. 8 shows a watergate holder comprising an embedded O-ring.

The sparger 98 also includes an opening 152 so as to hold a water gate which is sealed using an embedded O-ring 126 as shown in FIG. 8. Advantage of this technique allows for easier alteration and control of the height of the water gate, as well as an easy replacement of the base cup downcomer. Upper 106 and lower 108 plates, as well as the sparger 98, are made of 18 mm thick chlorinated polyvinyl chloride (CPVC). They are also fitted in the bubble column using an embedded O-ring 124 as shown in FIG. 10.

Procedures

Air is initially blown into the bubble column humidifier using a blower so as to establish an air current. This air current prevents any untreated water from flowing through the sparger holes to the stage below. If the water was designated to flow first, it would pass through the sparger holes. FIG. 2 shows how the volumetric flow rate of the air stream is adjusted to the desired volumetric flow rate using an orifice meter 56 and throttle valve 62 [Munteshari, O. "Multi-stage bubble column humidifier for thermal Driven Mechanical Compression Humidification Dehumidification Desalination System: Appendix A; April 2014 Incorporated herein by reference in its entirety.]

After establishing a flowing air stream, the water supply valve 64 is opened. Throttle valve 62 is used to control the volumetric flow rate of water which is measured using a rotameter 78. The water heater 80 is turned on and set to the desired temperature. The system is observed for approximately 30 to 60 minutes, preferably 20 to 40 minutes, most preferably from 15 minutes to 20 minutes in order for the system to achieve steady state conditions. While the humidification process is running, the valves 66, 68, 72, 74, 76, rotameter 78, and orifice meter 56 are continuously monitored and readjusted to maintain a desired flow rate. At steady state conditions, the values of water temperatures at the inlet and outlet of the water stream and air dry-bulb/wet-bulb temperatures at the inlet, and outlet of the air stream are recorded using a series of thermocouples 76, 70, 66, 68, 72, and 74, respectively. The value of any pressure drop in the bubble column humidifier 82 is recorded using a manometer 54.

Measurement Devices

K-type thermocouples were used to measure the dry and wet temperatures of the inlet and outlet air and they were all calibrated together at the same time using the same data logger and bath of water. The thermocouples were all connected to a data logger with an accuracy of ±0.5° C. The rotameter used for water volumetric flow rate measurement has a range of 1-7 LPM (16.7-116.7 cm3/s) with accuracy of ±0.25 LPM (4.17 cm3/s). The pressure difference across the orifice meter and the pressure drop in the bubble column humidifier were measured using water manometers with accuracy of ±1 mm. The approach described by Coleman and Steele [Hugh W. Coleman and W. Glenn Steele. "Experimentation, Validation, and Uncertainty Analysis for Engineers, Third Edition". Experimentation, Validation, and Uncertainty Analysis for Engineers. John Wiley & Sons, Inc., 2009, pp. 257-269. Incorporated herein by reference in its entirety.] was performed, in order to estimate the uncertainty in the presented results. [Munteshari, O. "Multi-stage Bubble Humidifier for Thermal Driven Mechanical Compression Humidification Dehumidification Desalination System", Thesis, King Fahd University of Petroleum & Minerals Apr. 7, 2014. Appendix C Incorporated herein by reference in its entirety.] The uncertainty in the measurements is defined as the root sum square of the bias error of the instrumentation and the precession error observed. Accordingly, the resulting uncertainties are ±0.67 cm/s, ±0.283 kg/s, ±0.83%, ±0.85% and ±2.52% in the calculated air superficial velocity, mass flow rate ratio, inlet air relative humidity, outlet air relative humidity and humidifier effectiveness.

In describing embodiments of the invention, specific terminology is used for the sake of clarity. For the purpose of description, specific terms are intended to at least include technical and functional equivalents that operate in a similar manner to accomplish a similar result. Further, where parameters for various properties or other values are specified herein for embodiments of the invention, those parameters or values can be adjusted up or down by a factor of 1, 2, 3, 4, 5, 6, 8, 10, 20, 50, 100, etc., or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments.

U.S. Pat. No. 8,523,985 and US 2014/0367871 are each incorporated herein by reference in their entireties.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A multi-stage bubble-column humidification apparatus, comprising:
   an external shell defining an interior region;
   a plurality of horizontal porous structures defining pairs of adjacent vertical chambers within the interior region;
   a carrier gas inlet;
   a carrier gas outlet;
   a liquid remnant outlet comprising a discharge siphon system;
   a feed liquid inlet; and
   a series of downcomer units wherein each pair of vertically adjacent chambers is in liquid communication via at least one downcomer unit;
   wherein the vertical chambers within the interior region comprise at least a lowermost proximal chamber, an uppermost distal chamber and at least one mid-chamber between the proximal and distal chambers,
   the lowermost proximal chamber comprises:
      the carrier gas inlet; and
      the liquid remnant outlet,
   the uppermost distal chamber comprises:
      the feed liquid inlet; and
      the carrier gas outlet,
   each downcomer unit comprises:
      a funnel;
      a watergate;
      a base cup downcomer;
   wherein a lower portion of the watergate is seated in the base cup downcomer and an upper portion is coupled to the funnel.

2. The multi-stage bubble-column humidification apparatus of claim 1 wherein the external shell comprises:
   a column;
   an upper plate; and
   a lower plate;
   wherein the upper plate and the lower plate are secured to the column with an embedded O-ring.

3. The multi-stage bubble-column humidification apparatus of claim 1 wherein the watergate is secured within a corresponding porous structure with an embedded O-ring.

4. The multi-stage bubble-column humidification apparatus of claim 1 wherein the base cup downcomer is secured to a corresponding porous structure at a bottom of the lower vertically adjacent chamber with an embedded O-ring.

5. The multi-stage bubble-column humidification apparatus of claim 1 wherein the base cup terminates at a point below a liquid level of any of the proximal, distal or mid chambers, and is configured to distribute a liquid from the watergate in an even-flowing pattern.

6. The multi-stage bubble-column humidification apparatus of claim 1 wherein the base cup is configured to collect a sediment fraction of a liquid so as to prevent or reduce a fouling of a corresponding porous structure.

7. The multi-stage bubble column humidification apparatus of claim 1 wherein the liquid remnant outlet comprises a liquid discharge siphon system is configured so that no gas exits with remnant liquid.

8. The multi-stage bubble-column humidification apparatus of claim 1 wherein in each vertical chamber, a width of each chamber is at least twice a height of the chamber wherein the width is defined by the horizontal distance of the external shell, and the height is defined by the vertical distance between adjacent porous structures.

9. The multi-stage bubble-column humidification apparatus of claim 1 wherein the funnel and the watergate are not contiguous with the external shell.

10. The multi-stage bubble-column humidification apparatus of claim 1 wherein the watergate is capable of being configured so as to lengthen or shorten a passageway of liquid communication between the vertically adjacent chambers.

11. The multi-stage bubble-column humidification apparatus of claim 1 wherein the funnel is configured to limit or eliminate entrance of a foam into a watergate.

12. The multi-stage bubble-column humidification apparatus of claim 1 wherein each porous structure is one selected from the group consisting of a sieve plate, a radical sparger, a ring sparger, a spider sparger, and a wheel-type sparger.

13. The multi-stage bubble-column humidification apparatus of claim 1 wherein a lower surface of each of porous structure comprises openings of a greater diameter as compared to openings of an upper surface of the porous structure.

14. The multi-stage bubble-column humidification apparatus of claim 1 wherein the downcomer units are arranged along a periphery of the distal, mid, and proximal chambers in a vertical, offset pattern, or juxtaposed relationship.

15. The multi-stage bubble-column humidification apparatus of claim 1, wherein the feed liquid inlet is configured to be connected to a liquid source comprising at least one liquid selected from the group consisting of sea water, brackish water, flowback water, and water produced during an oil or gas extraction process.

16. A method of humidifying a gas in the multi-stage bubble: column humidification apparatus of claim 1, comprising:
    transferring a mass and temperature from a liquid stream to a carrier gas stream via formation of two cross-flow streams comprising:
    feeding a liquid steam comprising a vaporizable component into an uppermost distal chamber to form a distal-stage bath at a third humidification temperature;
    feeding a first remnant of the liquid from the uppermost distal chamber into a mid-stage chamber to form a mid-stage bath at a second humidification temperature, wherein the second humidification temperature is lower than the third humidification temperature;
    feeding a second remnant of the liquid from the mid-stage chamber into a lowermost proximal chamber of the multi-stage humidifier to form a proximal-stage bath at a first humidification temperature, wherein the first humidification temperature is lower than the second humidification temperature;
    siphoning a third remnant of the feed liquid from the lowermost proximal chamber so as to assure that no gas is included in said third remnant;
    introducing a gas into the lowermost proximal chamber at a point above the lowermost proximal-stage bath;
    directing the gas directly from the lowermost proximal chamber into the mid-stage bath of the mid-chamber and bubbling the gas through the liquid remnant in the mid-stage bath, where the carrier gas collects the vaporizable component in vapor form from the second remnant of the feed liquid to partially humidify the carrier gas with the vaporizable component;
    separating the mid-stage bath from the distal-stage bath by a top gas region in the mid-chamber filled with the partially humidified gas from the bubbling in the mid-stage bath prior to directing the partially humidified carrier gas directly from the mid-chamber into the distal-stage bath of the uppermost distal chamber and bubbling the gas through the distal-stage bath, where the gas collects more of the vaporizable component in vapor form from the liquid to further humidify the gas with the vaporizable component;
    and
    removing the humidified gas from the uppermost distal chamber.

17. The method of claim 16, further comprising condensing the vaporizable component from the humidified carrier gas in a dehumidifier after the humidified carrier gas is removed from the distal chamber.

18. The method of claim 16, wherein the vaporizable component is water.

19. The method of claim 16, wherein the liquid stream is selected from the group consisting of sea water, brackish water, flowback water, and water produced during an oil or gas extraction process.

* * * * *